US008633948B2

(12) United States Patent
Hayes

(10) Patent No.: US 8,633,948 B2
(45) Date of Patent: Jan. 21, 2014

(54) SINGLE-PASS AND ORDER-INDEPENDENT TRANSPARENCY IN COMPUTER GRAPHICS USING CONSTANT MEMORY

(75) Inventor: Nathan T. Hayes, Minneapolis, MN (US)

(73) Assignee: Sunfish Studio, LLC, Minneapolis, MN (US)

(*) Notice: Subject to any disclaimer, the term of this patent is extended or adjusted under 35 U.S.C. 154(b) by 930 days.

(21) Appl. No.: 12/596,093

(22) PCT Filed: Apr. 16, 2008

(86) PCT No.: PCT/US2008/060463
§ 371 (c)(1),
(2), (4) Date: Apr. 5, 2010

(87) PCT Pub. No.: WO2008/130992
PCT Pub. Date: Oct. 30, 2008

(65) Prior Publication Data
US 2010/0188416 A1    Jul. 29, 2010

Related U.S. Application Data

(60) Provisional application No. 60/923,585, filed on Apr. 16, 2007.

(51) Int. Cl.
*G09G 5/00* (2006.01)
*G06T 15/50* (2011.01)
*G09G 5/02* (2006.01)

(52) U.S. Cl.
USPC ............ 345/633; 345/626; 345/426; 345/589

(58) Field of Classification Search
USPC ........................................................ 345/633
See application file for complete search history.

(56) References Cited

U.S. PATENT DOCUMENTS

| 6,670,955 | B1 * | 12/2003 | Morein .......................... 345/421 |
| 6,760,024 | B1 | 7/2004 | Lokovic et al. |
| 7,167,181 | B2 | 1/2007 | Duluk, Jr. et al. |
| 2004/0169650 | A1 | 9/2004 | Bastos et al. |
| 2004/0169651 | A1 * | 9/2004 | Everitt et al. .................. 345/426 |
| 2005/0225670 | A1 * | 10/2005 | Wexler et al. .................. 348/441 |
| 2006/0268000 | A1 | 11/2006 | Long |

OTHER PUBLICATIONS

Mulder, Jurriaan D., Frans CA Groen, and Jarke J. van Wijk. "Pixel masks for screen-door transparency." Proceedings of the conference on Visualization'98. IEEE Computer Society Press, 1998.*
PCT International Search Report and Written Opinion of the International Searching Authority, PCT Application No. PCT/US08/60463, Sep. 2008.

* cited by examiner

*Primary Examiner* — Ulka Chauhan
*Assistant Examiner* — Sae Won Yoon
(74) *Attorney, Agent, or Firm* — Nawrocki, Rooney & Sivertson, P.A.

(57) ABSTRACT

A single-pass, order-independent method in support of rendering transparency effects into a computer generated image is provided. A geometric primitive of a scene is rasterized so as to convert the geometric primitive into a set of pixels. For at least each pixel or subpixel, a stipple pattern is selected from a set of unique stipple patterns. The set of unique stipple patterns is characterized by a select opacity value with the stipple pattern delimiting a unique set of pixels in the computer generated image which contributes to a visible surface determination.

26 Claims, 20 Drawing Sheets

FEATURE COMPARISON
OF PRIOR-ART TRANSPARENCY METHODS

| TRANSPARENCY METHOD | ORDER INDEPENDENT | CONSTANT MEMORY | SINGLE PASS | HIGH QUALITY |
|---|---|---|---|---|
| PAINTER'S ALGO. | NO | YES | YES | YES[1] |
| A-BUFFER | YES | NO | YES | YES |
| DEPTH PEELING | YES | YES[2] | NO | YES |
| SCREEN DOOR | YES | YES | YES | NO[3] |

(1) Does not support interpenetrating objects
(2) A variable (but usually bounded) amount of memory is sometimes needed
(3) Overlapping transparent objects are not computed correctly

FIG. 1

STIPPLE PATTERN FOR "SCREEN DOOR" TRANSPARENCY (PRIOR ART)

OPACITY VALUES (FRACTIONS)

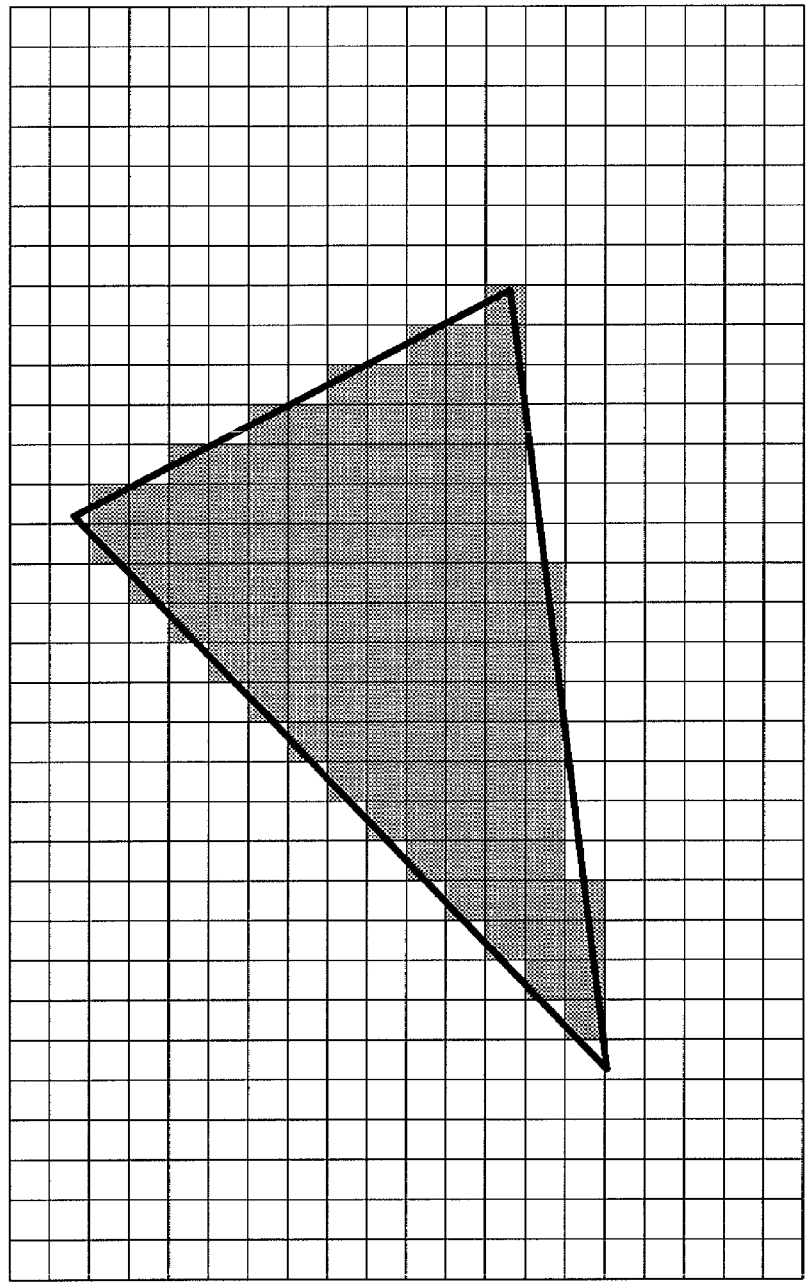

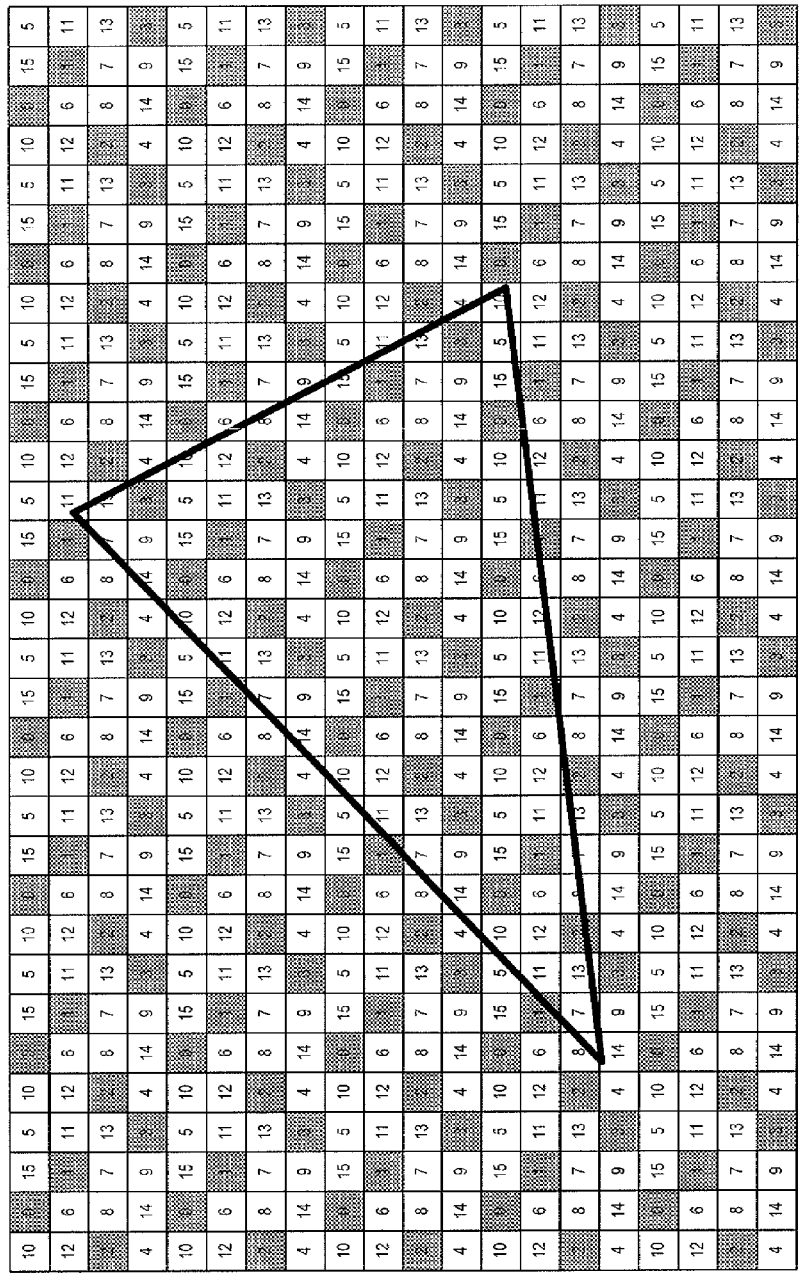

"SCREEN DOOR" TRANSPARENCY
(PRIOR ART)

Logical conjunction of 4(a) and 4(b)

FIG. 6 (c)

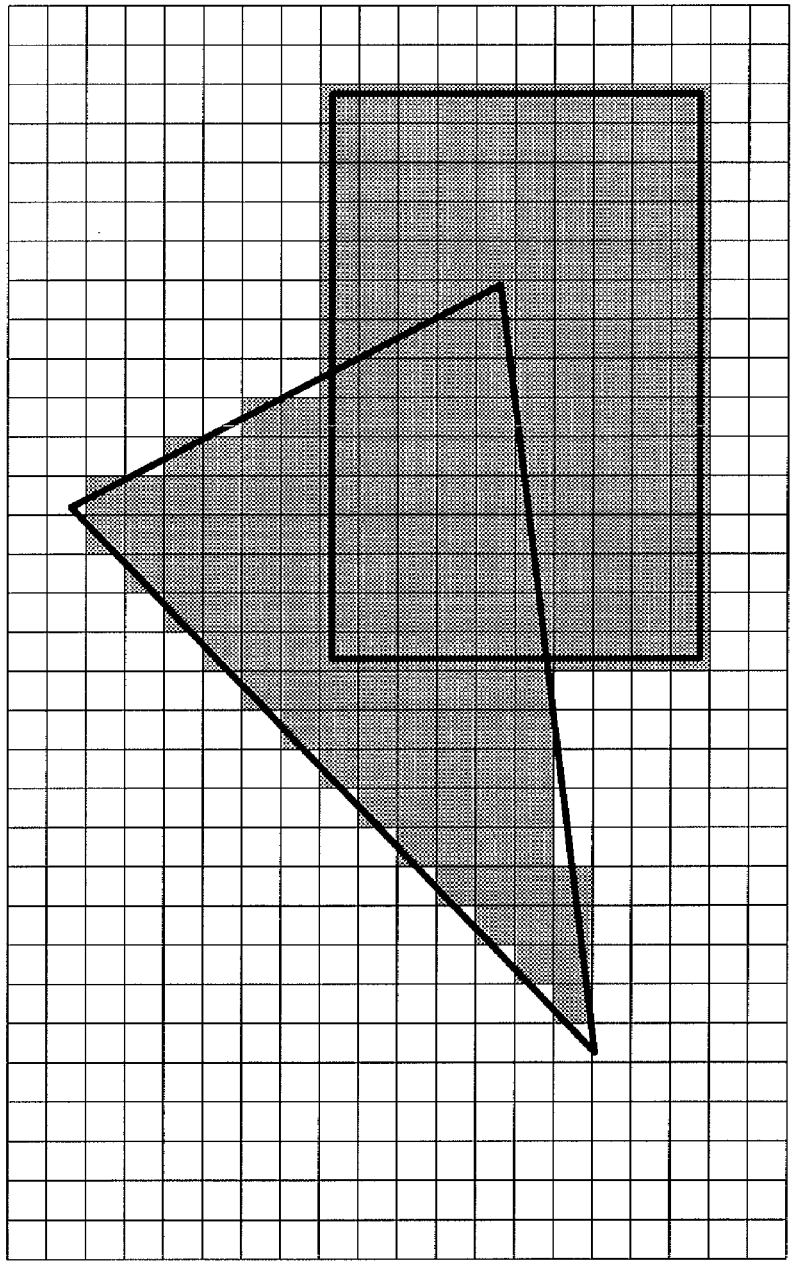

"SCREEN DOOR" TRANSPARENCY
(PRIOR ART)

Both geometric primitives share the same stipple pattern

"SCREEN DOOR" TRANSPARENCY
(PRIOR ART)

No pixels from distant geometric primitive are visible in overlap region

FIG. 8 (c)

PRESENT INVENTION

FIG. 13 (a) Stipple pattern $D_4$ for nearest geometric primitive (triangle)

Stipple pattern $D_8$ for distant geometric primitive (rectangle)

PRESENT INVENTION

FIG. 13 (c)

Pixels from both geometric primitives are visible in overlap region

SINGLE-PASS AND ORDER-INDEPENDENT TRANSPARENCY IN COMPUTER GRAPHICS USING CONSTANT MEMORY

This is an international patent application filed under 35 U.S.C. §363 claiming priority under 35 U.S.C. §119(e)(1) of U.S. provisional patent application Ser. No. 60/923,585 entitled SINGLE-PASS AND ORDER-INDEPENDENT TRANSPARENCY IN COMPUTER GRAPHICS USING CONSTANT MEMORY filed Apr. 16, 2007 and incorporated herein by reference in its entirety.

TECHNICAL FIELD

The present invention generally relates to computer graphics or imaging, more particularly, to the field of photorealistic image synthesis, and more particularly still, to the improved rendering of transparency effects and the like.

BACKGROUND OF THE INVENTION

The rendering of transparent objects in computer graphics can be expensive. Generally speaking, transparency is a global illumination method, that is, it requires random access to geometric primitives of a scene stored in computer memory. Good approximations of transparency can be computed, however, with local illumination methods, that is, methods which require access to only a single geometric primitive. The primary advantage of computing transparency with a local illumination method is speed and efficiency, as the transparency can in this case be achieved without requiring all geometric primitives in the scene to be stored in computer memory for random access. This is important when rendering large scenes, e.g., scenes with so many geometric primitives they do not fit within the virtual memory of a computing environment.

Several approaches to computing transparency as a local illumination method exist in the prior art. All of these approaches fall generally into one of four different categories, e.g., order-dependent, order-independent, "depth-peeling," or "screen door."

The first category involves methods which are order-dependent, that is, all transparent geometric primitives in the scene are processed in a particular order. For example, if all such geometric primitives having the greatest distance from the viewpoint are processed first, then transparent objects closer to the viewpoint can be blended with pixels from previously rendered objects further from the viewpoint. This method is sometimes referred to as the "painter's algorithm." Although conceptually simple, such order-dependent methods tend to work only in highly contrived situations; as is widely known, for example, such a method is not capable of calculating correct solutions for scenes comprised of inter-penetrating objects. Furthermore, because all geometric primitives in the scene must be sorted before rendering of the scene begins, it can be prohibitively expensive and in some cases completely intractable. This is especially true for large scenes comprised of millions or billions of geometric primitives.

To remedy the shortcomings of such order-dependent methods, several categories of order-independent methods were developed. One popular method was developed and implemented in Pixar Corporation's RENDERMAN image processing software by Loren Carpenter, i.e., "The A-buffer, an Antialiased Hidden Surface Method," Carpenter, Loren, Computer Graphics 18.3, 1984. In this method, lists of accumulated fragments of transparent geometric primitives are associated with each pixel in the image. To calculate the final transparency contribution of the fragments, each list in each pixel is sorted in back-to-front order so the fragments of each list can be blended together properly. This is essentially the same method as the "painter's algorithm," except the sorting occurs after geometric primitives have been converted into fragment-lists. Unlike the "painter's algorithm," the A-buffer is a high quality transparency method which properly handles interpenetrating objects and does not require geometric primitives in the scene to be processed in any particular order. For this reason, it is considered an order-independent method, even though sorting still occurs on the fragment-lists. By far the most problematic and inconvenient aspect of this method is that the fragment-lists consume large amounts of memory. Furthermore, knowing in advance how much memory is required to render a particular scene is a hard and usually intractable problem to solve. Depending on the scene, the memory requirements may be unbounded for all that computationally matters. As a result, this method can often exhaust available memory resources, resulting in system crashes by causing out-of-memory conditions. More recent refinements of this method, e.g., "R-Buffer: A Pointerless A-Buffer Hardware Architecture," Wittenbrink, Craig, Proceedings of the ACM SIGGRAPH/Eurographics Workshop on Graphics Hardware, 2001, attempt to minimize the memory consumption problem by "recycling" available memory resources. Although this alleviates the problem for some typical scene conditions, it is by no means a robust approach which guarantees a bound on memory usage.

Another order-independent method popular in the prior art trades the problem of large and potentially unbounded memory consumption for the cost of multiple render passes. Originally introduced by Abraham Mammen, i.e., "Transparency and Antialiasing Algorithms Implemented with the Virtual Pixel Maps Technique," Mammen, Abraham, IEEE Computer Graphics Applications 9.4, 1989, methods in this category are more commonly known today as "depth peeling." In this method, a dedicated framebuffer with a fixed number of bits per pixel is employed to compute a transparency effect in multiple passes, that is, the entire scene, or portions thereof, are repeatedly rendered, or processed, multiple times. Many modern variations of the depth-peeling method exist, most notably U.S. Pat. Appl. Pub. No. 20040169650 entitled DIGITAL IMAGE COMPOSITING USING A PROGRAMMABLE GRAPHICS PROCESSOR, which describes a highly optimized depth-peeling technique for modern programmable graphics processors. Depth-peeling techniques are well-suited for hardware implementations because they require only a constant amount of memory which is deterministically a function of image resolution. A primary disadvantage is that multiple-passes require extra computation time as well as an ability to efficiently "redraw" the entire scene, or portions thereof. In most practical implementations, this means storing at least a portion of the scene in computer memory so that the "redraws" can be done quickly, thereby destroying the true nature of the otherwise constant memory requirements. In other words, typical implementations still require a variable amount of memory to "cache" portions of the scene so that multiple-passes can be quickly computed.

Last but not least, a final category of order-independent methods known collectively as "screen door" transparency offers a true constant-memory solution, but at the cost of an inability to achieve high-quality results. Consider, for example, that such methods are also commonly known by people skilled in the art as the "cheesy translucency" effect, e.g., "OpenGL Programming Guide," Woo, Mason, et. al., Addison Wesley, 2005. The screen door transparency method involves creating a stipple pattern which is a function of the transparency of a geometric primitive. The stipple pattern is then used during the rendering process as a mask to prevent a portion of the rasterized fragments of the geometric primitive from contributing to the reconstruction of an image. The result is a transparency method which simulates the effect of looking through a screen door, where the density of the mesh of the screen on the door determines the amount of "transparency." Such transparency methods are extremely well-suited for hardware implementations because they are order-independent, operate in a single pass and require only a strictly deterministic and constant amount memory.

The main drawback of "screen door" transparency is its inability to properly "accumulate" the contribution of overlapping transparent objects in the final image. This is a consequence of the previously described stipple pattern used by the method. Consider, for example, two overlapping transparent geometric primitives that both have the same amount of transparency. In this case, both objects must also have the same stipple pattern. As a consequence only the object which is processed first, or, if depth-buffering is performed, only the object closest to the viewpoint will be visible. This destroys the realism of the transparency effect, effectively limiting the method to scenes which have no overlapping transparent objects. Some efforts have been made to ameliorate this problem. The publication "Pixel Masks for Screen-Door Transparency," Mulder, J., et. al., VIS 98: Proceedings of the Conference on Visualization, IEEE Computer Society, 1998, is one example, and it is incorporated herein by reference. But such efforts only offer marginal improvements for a small case of limited and/or contrived circumstances. No general solutions in the prior art exist. The most likely reason for this is that practitioners and people skilled in the art largely view the method as a cheap but low-quality hack, e.g., the "cheesy translucency" reference previously cited. As a consequence, there seems to have been little hope or no interest over the years to ever consider its potential as a method to provide high-quality results.

In summary, FIG. 1 is a tabulated feature comparison of prior art transparency methods. As can clearly be seen, all prior art methods have an Achilles heel. The "painter's algorithm" is not order-independent, and it cannot properly handle scenes with interpenetrating objects. The A-buffer method allows objects in the scene to be processed in any order, but the memory requirements are large and hard to anticipate, making the method prohibitively expensive in some cases. Depth peeling methods can operate within a constant memory footprint, or within a generally bounded amount of memory, at the expense of requiring multiple passes, i.e., the entire scene, or portions thereof, must be processed and/or rendered multiple times. The screen door method is particularly efficient, but the quality is poor because the transparency of overlapping objects cannot properly "accumulate," effectively limiting this approach to scenes comprised of non-overlapping transparent objects or situations where high-quality results are not important.

Clearly what is desired is a new and improved method of transparency in computer graphics which is order-independent, operates in a single pass, uses a deterministic and constant amount of memory, and is able to reliably generate high-quality and realistic images for scenes comprised of interpenetrating and/or overlapping transparent geometric primitives.

SUMMARY OF THE INVENTION

The present invention provides a system and method of transparency in computer graphics which achieves all the previously desired characteristics, that is, the present invention provides a system and method for transparency in computer graphics which is order-independent, operates in a single pass, uses a deterministic and constant amount memory, and is able to reliably generate high-quality and realistic images for scenes comprised of interpenetrating and/or overlapping transparent geometric primitives.

The present invention is predicated upon an observation that the failure of the "screen door" transparency method and its ability to compute correct results for interpenetrating and/or overlapping transparent geometric primitives is due to the fact that geometric primitives sharing an identical amount of transparency also share identical stipple patterns. Therefore any information regarding the relative depth ordering of the geometric primitives in a region of overlap must be lost in a reconstruction of an image.

To remedy this unwanted effect, the present invention selects a stipple pattern which is not only a function of transparency but is also a function of depth. As a consequence, the present invention preserves information regarding the relative depth ordering of the geometric primitives in a region of overlap, therefore causing the region of overlap between the transparent geometric primitives to render correctly in the reconstruction of the image.

In a preferred non-limiting embodiment of the method of the subject invention, a geometric primitive of a scene is rasterized so as to convert the geometric primitive into a set of pixels. For at least each pixel or subpixel, a stipple pattern is selected from a set of unique stipple patterns. The set of unique stipple patterns is characterized by a select opacity value with the stipple pattern delimiting a unique set of pixels in the computer generated image which contributes to a visible surface determination.

In an further alternate non-limiting embodiment of the method of the subject invention, for a select opacity value for at least a pixel or a subpixel of a set of pixels, a stipple pattern is selected from a set of unique stipple patterns. Each stipple pattern of the set of unique stipple patterns is delimited by a select depth permutation of a set of unique depth permutations of the select opacity value with the selected stipple pattern delimiting a unique set of pixels in the computer generated image which contribute to a visible surface determination.

In yet a further alternate non-limiting embodiment of the method of the subject invention, an opacity value is associated with a pixel; a depth permutation is selected from depth permutations of the opacity value; a stipple pattern is delimited as a function of the opacity value and the selected depth permutation; and, the pixel is selectively culled from the computer generated image based upon the delimited stipple pattern.

The system and method of the present invention is well-suited for embodiment within a hardware circuit due to its constant and deterministic memory requirements. As will be obvious, embodiments of the present invention may be implemented in existing computer graphics hardware circuits; and in some cases requiring only minimal changes to existing hardware designs. For example, and without limitation, hardware circuits produced by NVidia which support interactive real-time 3D graphics based on OpenGL and DirectX industry standards.

The system and method of the present invention may be advantageously embodied within the executable machine code of a computer program designed for the purpose of rendering and/or synthesizing photo-realistic images. Non-limiting examples include Pixar's RENDERMAN or MENTAL RAY rendering software by Pixar and Mental Images G.m.b.H. & Co. respectively.

The system and method of the present invention may be advantageously combined with embodiments of Applicant's U.S. Pat. No. 7,250,948 entitled SYSTEM AND METHOD OF VISIBLE SURFACE DETERMINATION IN COMPUTER GRAPHICS USING INTERVAL ANALYSIS, published international application WO/2007/098349 A2 entitled PSEUDO-RANDOM INTERVAL ARITHMETIC SAMPLING TECHNIQUES IN COMPUTER GRAPHICS, and/or published international application WO/2007/041653 A2 entitled SYSTEM AND METHOD TO COMPUTE NARROW BOUNDS ON A MODAL INTERVAL SPHERICAL PROJECTION.

Furthermore, as will be shown, embodiments of the present invention may be advantageously combined with many popular shadow-generation systems and methods in computer graphics related to, for example, all of the previously described embodiments. This is due to the fact that rendering of high-quality transparency effects in computer graphics is a necessary component and/or step of many popular shadow-generation systems and/or methods in the computer graphics industry. As a consequence, the present invention provides a significant advantage and benefit to embodiments of such systems and/or methods, and the combination of the present invention with such systems and/or methods is contemplated and described in detail.

BRIEF DESCRIPTION OF THE DRAWINGS

FIG. 1 is a tabulated feature comparison summary of prior-art transparency methods;

FIGS. 6(a)-6(c) are select representations of aspects of the "screen door" transparency method of FIG. 5 or the like in connection to a single geometric primitive;

DETAILED DESCRIPTION OF THE INVENTION

Figure 2:
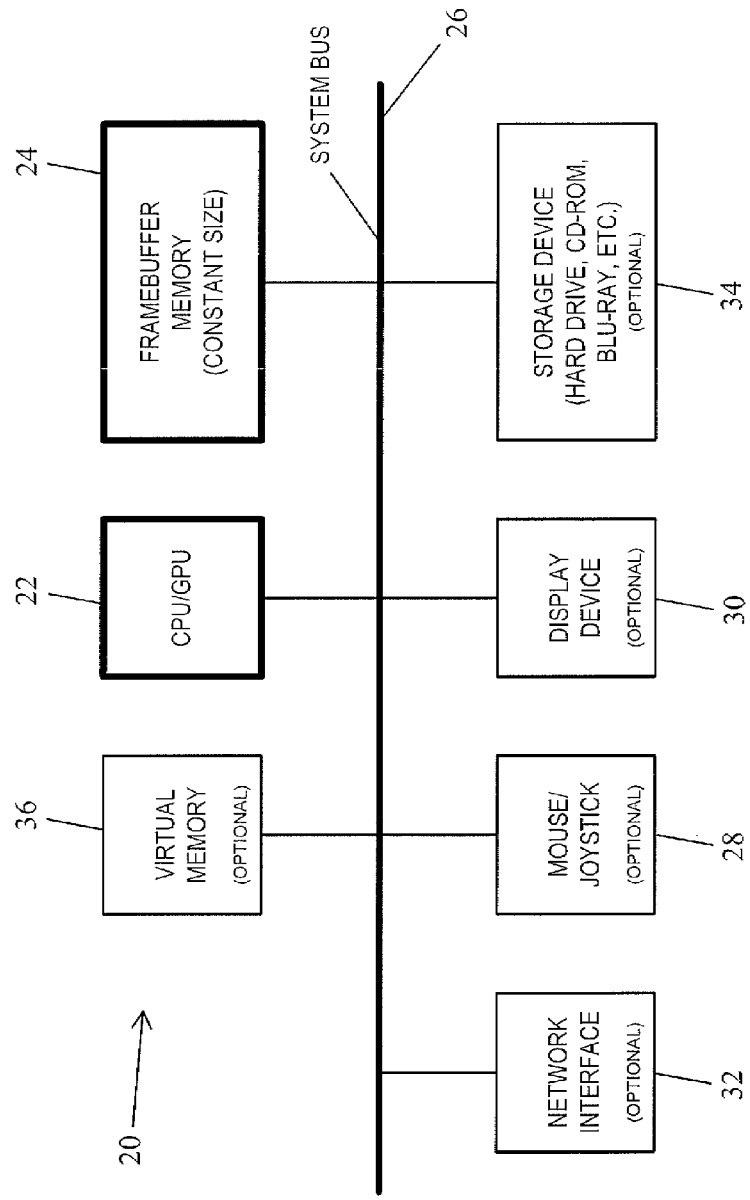
FIG. 2 depicts an exemplary, non-limiting system of the present invention.

FIG. 2 depicts an advantageous, non-limiting system 20 of the present invention. A central processing unit (CPU) or a graphics processing unit (GPU) 22 is connected to a framebuffer 24 comprising a portion of memory. In an embodiment of the present invention, the framebuffer may be comprised of a fixed number of bits-per-pixel; therefore the required allocation size of the framebuffer may be a strictly constant and deterministic function of image resolution. This is a highly desirable and advantageous prerequisite and/or consequence of the present invention, which will be explained shortly and in detail. Also attached to system bus 26 are other optional non-limiting peripherals, e.g., a mouse and/or joystick 28, a display device (analog or digital) 30, a network interface 32, and/or a storage device 34 such as a hard drive, CD-ROM or a BLU-RAY DISC optical/magneto-optical storage device.

The system bus may also be attached to a virtual memory subsystem 36. In one embodiment of the present invention, the portion of memory comprising the framebuffer resides in a virtual memory subsystem. In another embodiment of the present invention, the portion of memory comprising the framebuffer resides in a separate physical memory connected to the CPU/GPU by the system bus (as is the case depicted in FIG. 2). Either way, rendered images within the framebuffer can be applied via the system bus to any of the previously described optional peripherals. For example, rendered images within the framebuffer can be applied in real-time to an analog or digital display device, a network, or a storage medium connected to a storage device. Examples of well-known commercial products capable of comprising suitable embodiments of the present invention include desktop or rack-mounted personal computers, video graphics accelerators and X-BOX OR PLAYSTATION video gaming appliances.

Figure 3:
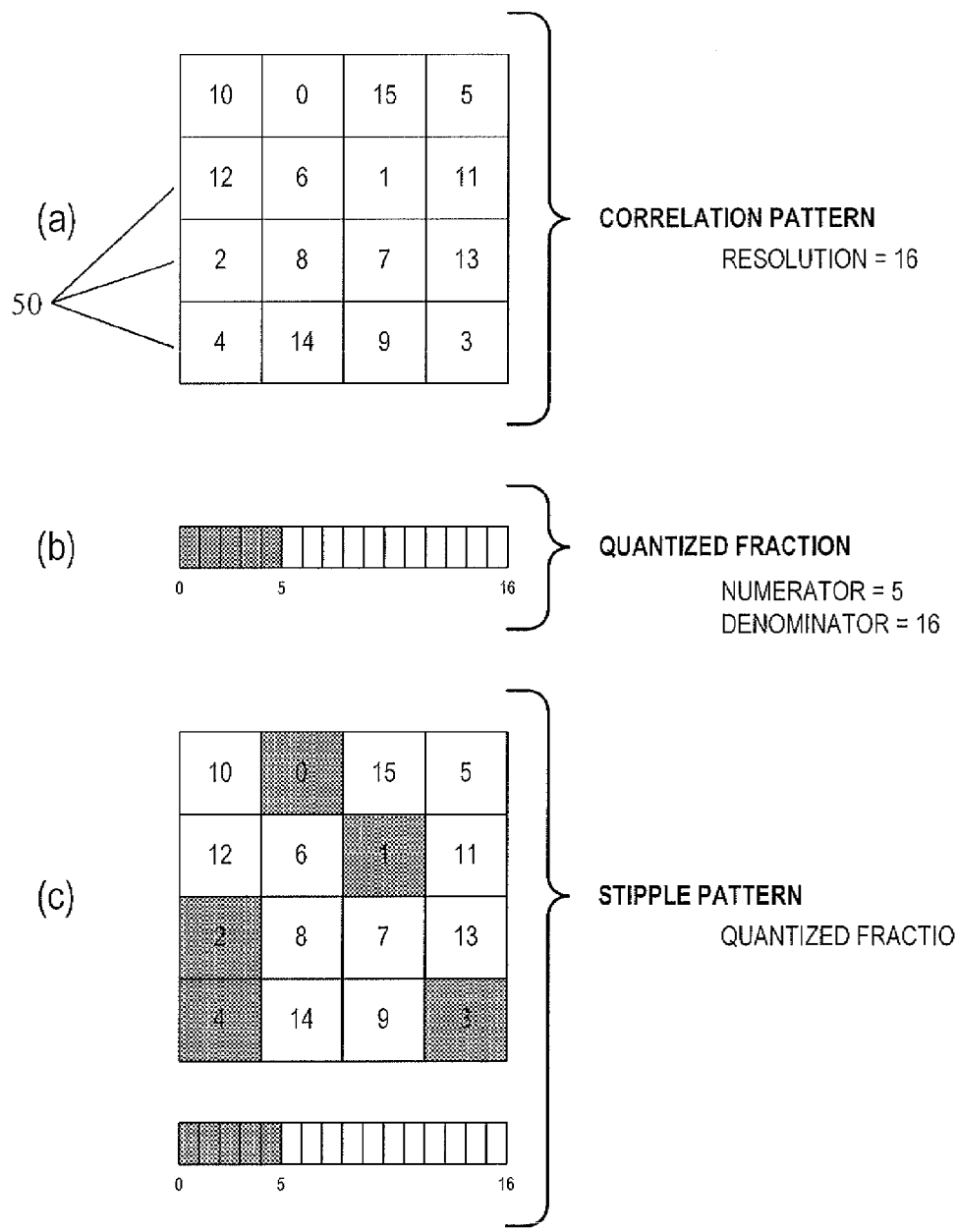
FIGS. 3(a)-3(c) depict notions related to the present invention, namely, correlation pattern, quantized fraction and stipple pattern, respectively.

FIG. 3 provides a graphical depiction of notions related to the present invention and the related prior art, namely correlation pattern, quantized fraction and stipple pattern. In the context of the present invention, a correlation pattern is a two-dimensional array of code values 50 arranged in a particular configuration. FIG. 3(a) shows an example wherein the correlation pattern is comprised of sixteen unique code values arranged randomly in a square two-dimensional array, each dimension of the array comprising four code values. It is not necessary that the width and height dimensions of the correlation pattern be identical, but in practice this is usually the most convenient choice and so the remainder of this disclosure will assume, without loss of generality, that the correlation pattern is a square array comprising sixteen code values. Correlation patterns comprising different dimensions, comprising a different amount of code values, and/or comprising a different configuration of code values are similarly contemplated and should be obvious. Methods for choosing, selecting or scrambling a configuration of code values within the two-dimensional array of the correlation pattern are well-known in the art, and any method to do so may be used. Most advantageously, but without limitation, the configuration of code values within the correlation pattern should be arranged in a random pattern reminiscent of the method used by the popular Soduku game, as is depicted in the configuration of the correlation pattern in FIG. 3(a).

For any given correlation pattern, the resolution of the correlation pattern is the total number of unique code values in the two-dimensional array. If the number of unique code values is equal to the total number of code values in the correlation pattern, then the resolution of the correlation pattern is simply its width dimension multiplied by its height dimension. This will not be true, for example, if duplicate code values exist in the correlation pattern, and this is not a limiting condition for any embodiment of the present invention. But it is sufficient that the resolution equals the total number of code values in the correlation pattern, as depicted in the correlation pattern of FIG. 3(a). Without loss of generality, and without limitation to any other embodiment, the remainder of this disclosure assumes it is true.

FIG. 3(b) is a graphical representation of a "quantized fraction." Fractions are by nature comprised strictly of integers, i.e., the numerator and denominator of a fraction are both integers. So in this sense the term "quantized fraction" may seem redundant. In the context of the present invention, the name is due to an assumption that the fraction comes from a clamped floating-point value in the range [0,1]. Such clamped floating-point values appear frequently in computer graphics, and the term "quantized fraction" is simply meant to imply the fraction has been obtained from such a clamped floating-point value. Furthermore, and in the context of the present invention, the denominator of a quantized fraction is always equal to the resolution of the correlation pattern. For example, the quantized fraction depicted in FIG. 3(b) has a denominator of 16 because this is the resolution of the correlation pattern in FIG. 3(a). The denominator is depicted graphically in FIG. 3(b) as an array of sixteen rectangular elements, and the numerator is the shaded or designated elements thereof. In the example of FIG. 3(b), the numerator is 5, so by convention the first five of the sixteen elements of the graphical representation of the fraction are shaded. This produces a graphical depiction of the quantized fraction which is reminiscent of a thermometer-like indicator, e.g., more shaded elements represent a fraction closer to one and less shaded elements represent a fraction closer to zero.

FIG. 3(c) depicts an example of a stipple pattern. In the prior art, a stipple pattern is comprised of two components, namely a correlation pattern and a quantized fraction. For example, each shaded element (i.e., the number of shaded elements) in the graphical depiction of the quantized fraction is likewise shaded in the correlation pattern. Correspondingly, the shaded code values in the correlation pattern are considered to be "in" the stipple pattern while all the rest are not. As can clearly be seen, numerator elements $\{0, 1, 2, 3, 4\}$ are shaded in the example quantized fraction of $5/16$, thereby requiring the same elements in the correlation pattern to be shaded. As a consequence, all the code values in the stipple pattern, and all that are not, are completely specified and/or determined.

Although FIG. 3(c) and its previous description is merely a graphical explanation of a stipple pattern, which has been presented that way for the sake of clarity, it is also an obvious method for computing a digital stipple pattern within a computer. For example, given a correlation pattern, i.e., a two-dimensional array of code values, and given a quantized fraction, i.e., two select or designated integers as previously discussed, a computer can select all the locations of code values in the correlation pattern which are associated with the numerator elements of the quantized fraction and apply them to the stipple pattern, thereby specifying which code values are in the stipple pattern and which are not. This is not the only method which can be used to construct a stipple pattern within a computer, but it is sufficient for the relevant discussion. For all that computationally matters in regards to both the present invention and the related prior art (see, for example, the previously cited reference by Mulder, et. al.), any other method must produce the same results, therefore it is a non-limiting example. Digressing into other similar but obvious methods would only serve to obscure the novelty of the present invention in relation to the prior art. So it is without limitation and/or a loss of generality that the remainder of this disclosure assumes it is the only method used.

Figure 4:
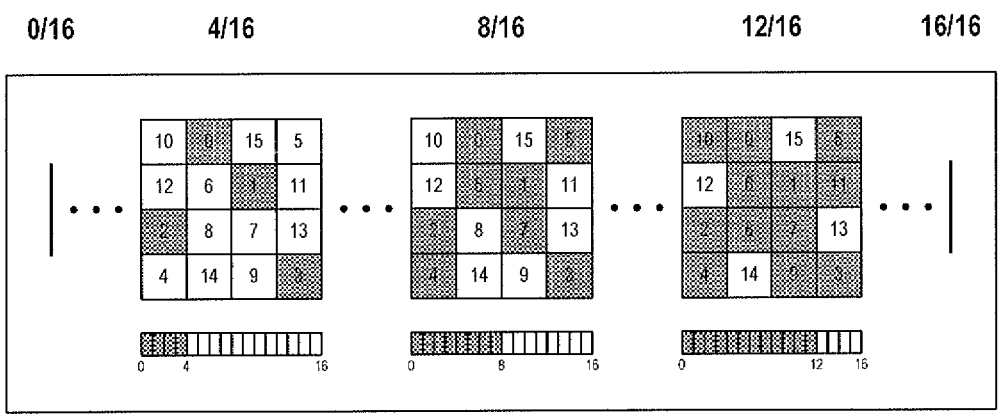
FIG. 4 depicts a series of stipple patterns reflecting select designated opacity values.

FIG. 4 shows the use of a stipple pattern in the previously discussed prior-art method of "screen door" transparency. An observation to be made is that when the quantized fraction is zero, no code values are in the stipple pattern, and when the quantized fraction is one, all code values are in the stipple pattern. In other words, if the quantized fraction is zero, the stipple pattern is completely transparent; and if the quantized fraction is one, the stipple pattern is completely opaque. When the quantized fraction takes on other intermediate values between zero and one, a proportional number of code values are shaded in the stipple pattern, thereby causing the stipple pattern to be "partially" transparent or opaque (and for this reason "transparency" and "opacity" can be used in discussion interchangeably since one is simply the reverse of the other). This is where the terminology "screen door" transparency comes from, i.e., the opacity value of the quantized fraction determines the number of code values which must appear in the stipple pattern, and this is analogous to selecting a density or thickness of a mesh on a screen door. The closer the ratio of opacity is to zero, the finer the density of the screen mesh is, thereby allowing a clearer view of the scene behind the screen door. FIG. 4 specifically shows examples of stipple patterns for opacity values of $4/16$, $8/16$ and $12/16$. Notice the amount of shaded code values in the stipple pattern is always proportional to the opacity value, thereby making the stipple pattern more opaque as the quantized fraction is closer to $16/16$ (i.e., one).

Figure 5:
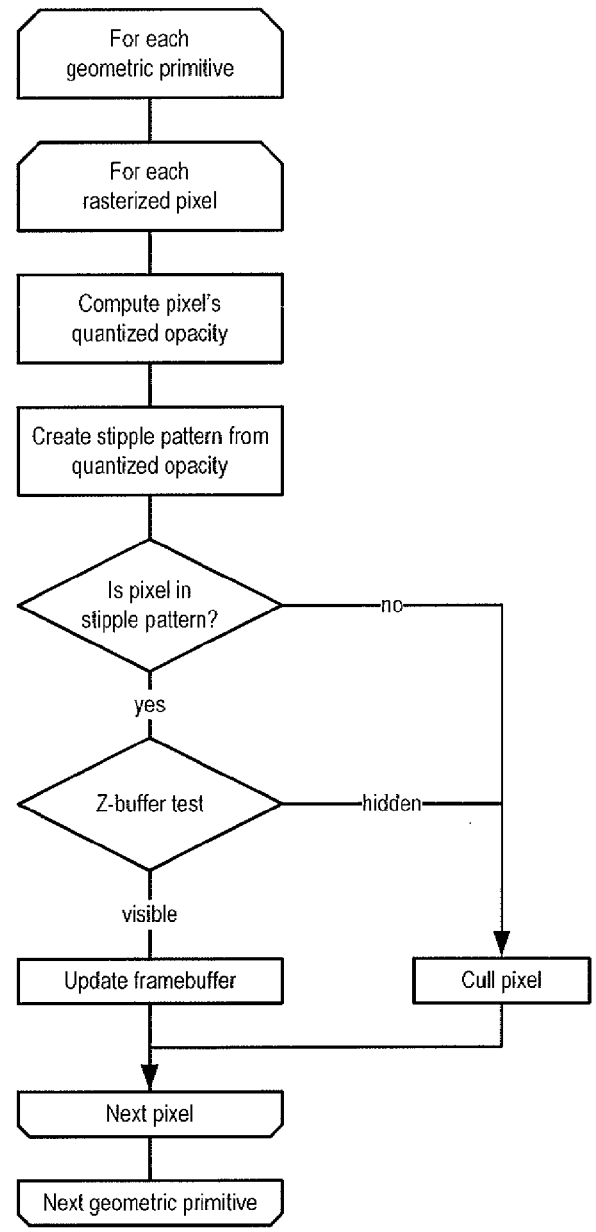
FIG. 5 is a flowchart representing an exemplary "screen door" transparency method of the prior art.

FIG. 5 shows how the stipple patterns depicted in FIG. 4 are used in a representative prior-art rendering method. First, geometric primitives in the scene are rasterized one at a time (the order in which they are rasterized does not matter). During rasterization, each primitive is converted into a set of pixels. For each rasterized pixel, an opacity value is computed and a respective stipple pattern is associated with and/or determined for the pixel (typically all pixels of the rasterized geometric primitive share the same opacity value and thus the same stipple pattern, but in the more general case this simplifying assumption may not always be true; it is therefore contemplated and considered in the present disclosure). Because the stipple pattern is often much smaller than the size of the rendered image, it is assumed to repeat, in a non-overlapping and tiled manner, multiple times over the image in both the horizontal and vertical directions. With this convention in mind, it is therefore possible to consider if any of the pixels belonging to the rasterized geometric primitive are also in the respective stipple pattern associated with and/or determined for each pixel. For all the pixels that are not, they are immediately culled from the rendering method and have no further contribution to the reconstruction of the final image. For the pixels that remain, they are further processed by a visibility step. Most practical embodiments employ a z-buffer to perform the visibility step, e.g., a depth value is associated with each pixel in the image and only the rasterized pixels which have depths closer to the viewpoint are rendered and all the rest are not, i.e., they are culled. The rasterized pixels which remain after the visibility step are then rendered into the image, i.e., all such remaining pixels within the image are updated in the framebuffer. Then the next geometric primitive is processed and the method repeats itself.

FIGS. 6(a)-(c) represent aspects of the screen-door method of FIG. 5 or the like in connection to a single geometric primitive. FIG. 6(a) shows all the pixels rasterized by a geometric primitive (in this case a triangle). If the assumption is made for this particular example that all rasterized pixels of the geometric primitive share the same opacity value of, say, $4/16$, then FIG. 6(b) shows the corresponding stipple pattern. Since the stipple pattern is much smaller than the dimensions of the image, it is repeated in a non-overlapping and tiled manner multiple times over the image in both the horizontal and vertical directions. As can clearly be seen, only the code values 0, 1, 2 and 3 are in the stipple pattern and the rest are not. FIG. 6(c) shows the logical conjunction, i.e., the logical "and," of the shaded pixels in FIG. 6(a) and FIG. 6(b). Pixels in FIG. 6(a) which are no longer shaded in FIG. 6(c) have been culled by the stipple pattern; pixels which remain shaded in FIG. 6(c) will be further processed by the visibility step of the method outlined in FIG. 5. It is precisely due to the fact that about $1-4/16=12/16$ of the shaded pixels in FIG. 6(a) are culled prior to the visibility step which is the cause of the "screen door" transparency effect of the prior art, i.e., the number of pixels culled by the stipple pattern is proportional to the number of code values in the stipple pattern, which in turn is proportional to the original opacity value.

By far the largest problem with this prior-art method is an inability to correctly render overlapping transparent geometric primitives. This is particularly true when the overlapping primitives share the same opacity value. In this case, the "screen door" method completely fails.

Figure 7:
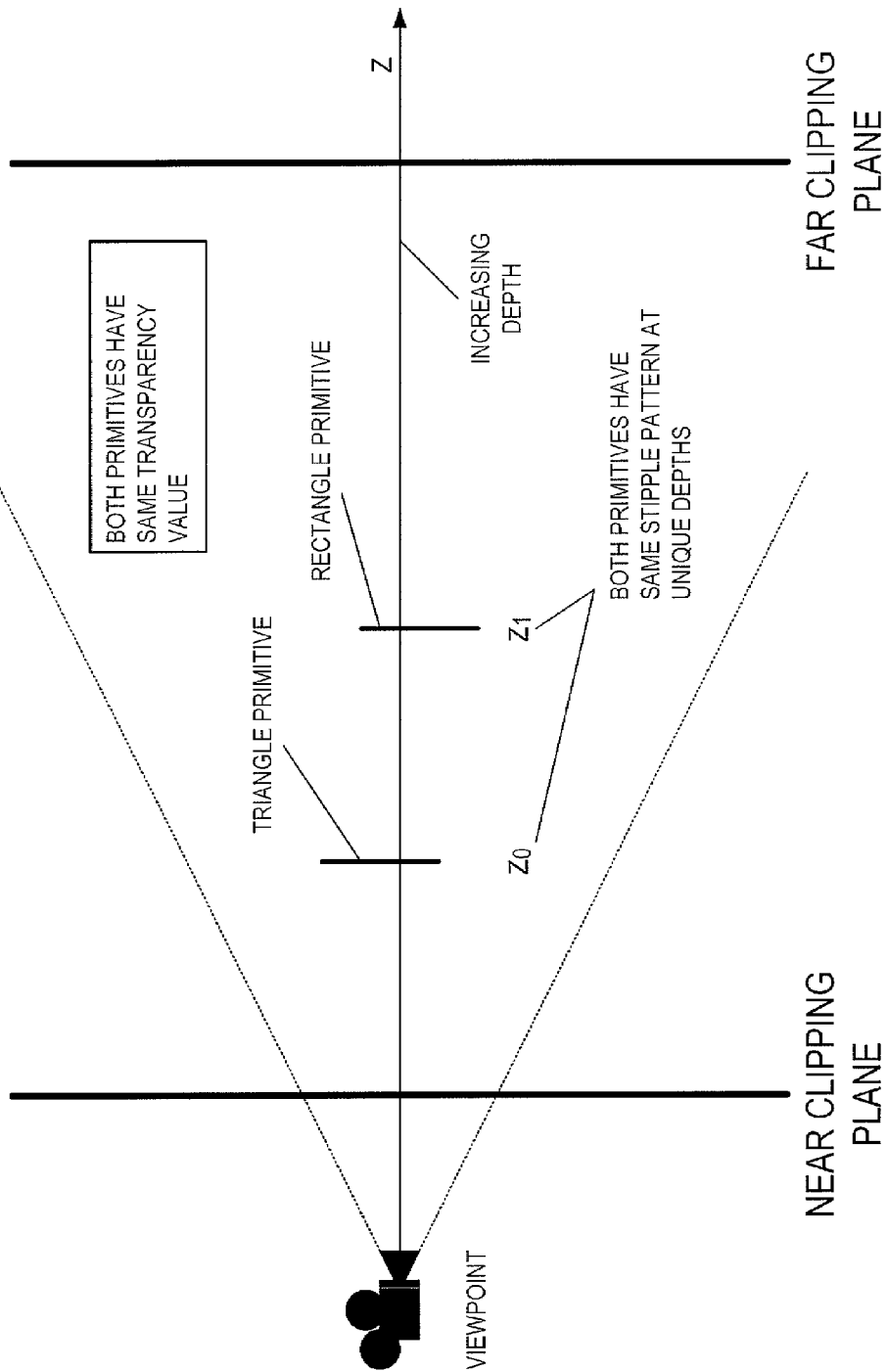
FIG. 7 depicts a representative, non-limiting arrangement of geometric primitives, more particularly, overlapping primitives from a select viewpoint, in connection to a "screen door" transparency method.

FIG. 7 is a typical example of such a scenario, i.e., it is a scenario which demonstrates a shortcoming of the prior-art "screen door" transparency method. Depicted in the figure are several familiar notions which are well-known in the art of computer graphics, namely the notions of near and far clipping planes of a viewpoint, and a relative depth ordering of geometric primitives in relation to the viewpoint. In this particular example, two geometric primitives are ordered in relation to the viewpoint such that one is closer to the viewpoint than the other. Because in this example both primitives are completely perpendicular to the viewpoint, the relative ordering of each primitive is characterized entirely by a unique depth value, i.e., $z_0$ and $z_1$. If the z-axis depicted in the figure is a measure of increasing depth relative to the viewpoint, then, as should be obvious, the triangle primitive is closer to the viewpoint than the rectangle primitive because in this case $z_0$ would be less than $z_1$.

Although the example in FIG. 7 is simplified to the extent that each primitive is completely perpendicular to the viewpoint, it should be plainly obvious this is a non-limiting simplification made purely for the sake of clarity. More general scenarios wherein the geometric primitives are not perpendicular to the viewpoint are perfectly suitable and amenable to either the prior art or the present invention. Such embodiments of both the prior art and the present invention are therefore contemplated and considered, even though, for the sake of clarity, they will not be dealt with explicitly in the figures or discussion of the present disclosure.

Since both geometric primitives lie between the near and far clipping planes, both will be rasterized and rendered in a reconstruction of an image. FIG. 8(a) shows all the pixels rasterized by the two geometric primitives. Notice in this example there is a region of overlap between the triangle and the rectangle, i.e., the rasterization process generates pixels in the region of overlap for both geometric primitives. In FIG. 7 it is given that the two geometric primitives share the same opacity value, say $4/16$. Then in this case FIG. 8(b) must also be the stipple pattern shared by the two geometric primitives. As in the previous discussions and examples, all rasterized pixels which are not in the stipple pattern are culled before the visibility step occurs; the results are illustrated in FIG. 8(c), i.e., the shaded pixels in FIG. 8(c) are to be further processed by the visibility step previously discussed and outlined in FIG. 5.

However, pay special attention to what will happen once the visibility step is executed. Because in FIG. 7 the two geometric primitives are at different depths relative to the viewpoint, it is the case that shaded pixels in the region of overlap depicted in FIG. 8(c) actually belong to both primitives, e.g., some of the shaded pixels in the region of overlap belong to the triangle and others belong to the rectangle. Generally speaking, it is not possible to render more than one geometric primitive into a single pixel, particularly if the framebuffer is comprised of a fixed number of bits per pixel, as is predicated by the present invention. Therefore it is the visibility step, typically embodied as a z-buffer, which must select or choose which geometric primitive will be rendered into each pixel. In this particular case, the visibility step will therefore choose the triangle for each shaded pixel in the region of overlap because it is the triangle which is closer to the viewpoint than the rectangle.

As a consequence, all shaded pixels in the region of overlap in FIG. 8(c) will be associated with the triangle and not the rectangle. Under normal circumstances, this would be a perfectly acceptable (and in fact desired) result. In the context of a prior-art "screen door" transparency method, however, this represents the reason for total failure of the method to properly render the region of overlap between the two transparent geometric primitives. Both geometric primitives are $4/16$ opaque. Therefore it would be expected that, in the region of overlap, the total accumulated opacity between the two geometric primitives should be $4/16+4/16=8/16$. But it is plainly obvious by looking at FIG. 8(c) this is not true. In fact, the total accumulated opacity is only $4/16$, since only the shaded pixels from the triangle remain. In this example, the prior art method has under-estimated the actual amount of accumulated opacity by a factor of two. Even worse, one-hundred percent of this underestimation is represented solely by the remaining pixels of the triangle, i.e., there is absolutely no contribution of pixels from the rectangle in the region of overlap.

Figure 8:
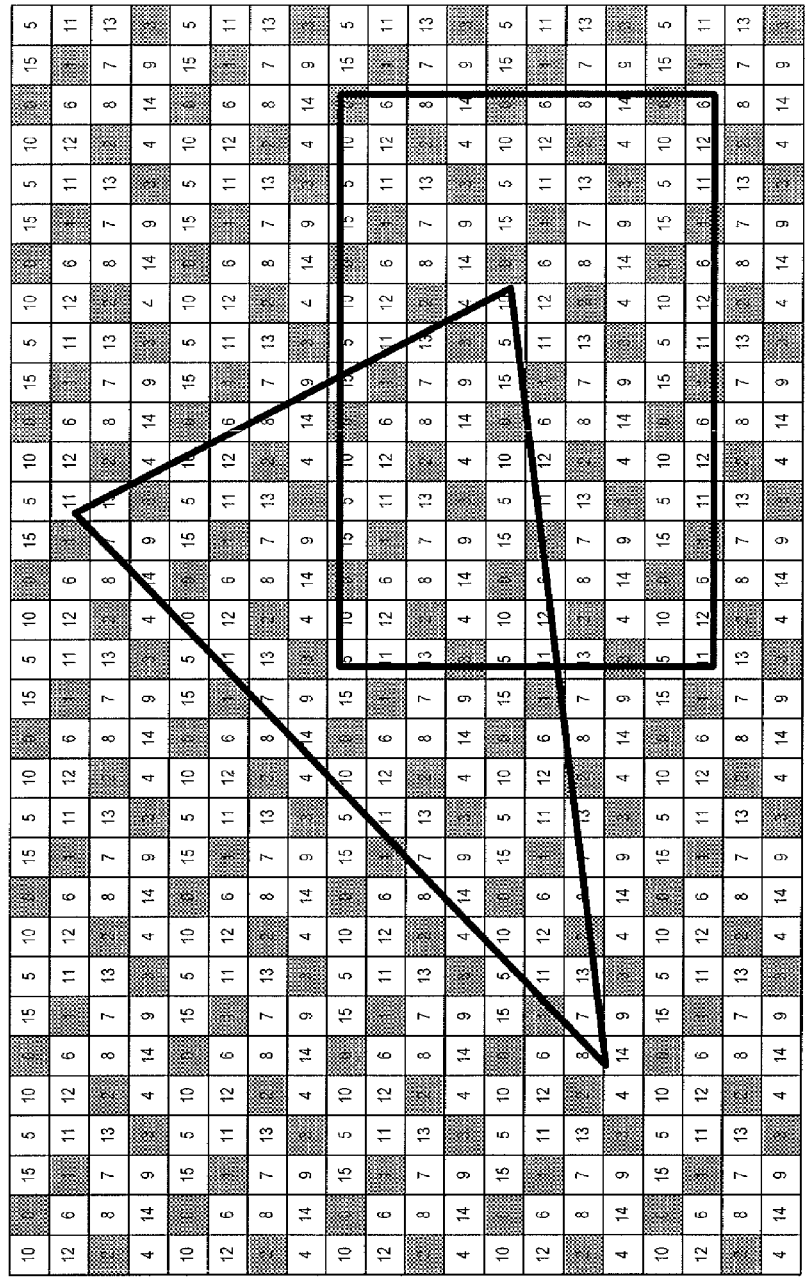
FIGS. 8(a)-8(c) are select representations of aspects of the "screen door" transparency method of FIG. 5 or the like in connection to the overlapping geometric primitives of FIG. 7.

More intuitively speaking, it is a fair assumption to make that because both of the overlapping geometric primitives are transparent, the total amount of accumulated transparency in the region of overlap should be some "blended" value of both geometric primitives. For example, if transparent pieces of red and blue plastic are placed in an overlapping configuration, the final result is a dark purple "blend" of the two pieces of colored plastic. However, what is happening in the examples depicted in FIG. 7-8(c) is just the opposite of this perfectly reasonable, physically accurate, and intuitive example. Instead, imagine that the overlapping pieces of red and blue plastic instead produced only a red "blend" that was indistinguishable from the piece of red plastic, exactly as if the blue piece of plastic did not even exist. This is precisely the case depicted in FIG. 8(c). If the triangle was the red piece of plastic and the rectangle was the blue, then in FIG. 8(c) the entire triangle appears red, even in the overlap region. What is instead expected is that the region of overlap would be a darker shade of purple, but this does not occur because no pixels from the rectangle remain in this region.

The genesis of the present invention is therefore predicated upon this observation that the failure of the "screen door" transparency method in the prior art, and thus its ability to compute correct results for interpenetrating and/or overlapping transparent geometric primitives, is due to the fact that geometric primitives sharing an identical amount of transparency, e.g., the geometric primitives in FIG. 7, also share identical stipple patterns, e.g., FIG. 8(b). Therefore any information regarding the relative depth ordering of the geometric primitives in a region of overlap must be lost in a reconstruction of an image, e.g., FIG. 8(c).

To remedy this unwanted effect, the present invention selects a stipple pattern which is not only a function of transparency but is also a function of depth. As will be shown, the present invention preserves information regarding the relative depth ordering of the geometric primitives in a region of overlap, therefore causing the region of overlap between the transparent geometric primitives to render correctly in the reconstruction of the image.

Figure 9:
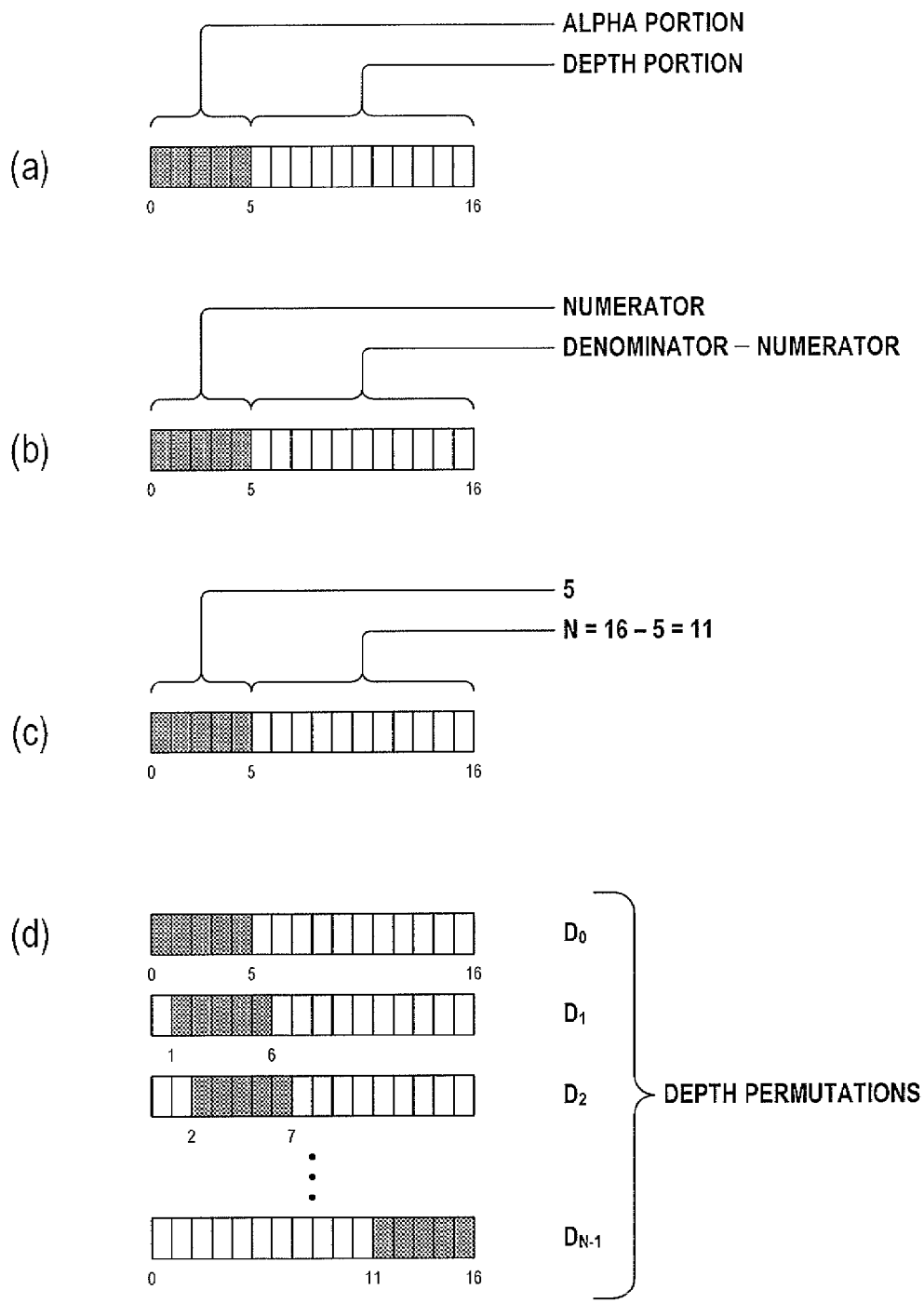
FIGS. 9(a)-9(d) illustrate concepts in support of the present invention, more particularly, that of depth permutations (FIG. 9(d)) and supporting notions relating thereto, e.g., alpha and depth portions of a quantized fraction (FIG. 9(a))

FIG. 9 provides a graphical depiction of notions related to the present invention, namely alpha and depth portions of a quantized fraction and depth permutations thereof. Whereas FIG. 3(b) previously introduced a graphical depiction of a quantized fraction in relation to the prior art, FIG. 9(a) introduces the notions of alpha and depth portions thereof. As depicted further in FIG. 9(b), the number of elements in the alpha portion of a quantized fraction is equivalent to the numerator. As before, this is graphically depicted as the shaded elements of the quantized fraction. Respectively, all the remaining elements of the quantized fraction which are not shaded belong to the depth portion of the quantized fraction. As depicted in FIG. 9(b), the number of elements in the depth portion of a quantized fraction is equal to the difference between the denominator and the numerator of the fraction, i.e., unity minus or less the quantized fraction. FIG. 9(c) provides an example for the quantized fraction $5/16$, wherein the number of shaded elements in the alpha portion is 5 (because 5 is the numerator), and the number of remaining elements in the depth portion is N=16−5=11 (because 16 is the denominator and/or resolution of the quantized fraction).

As depicted in FIG. 9(d), if N is the number of elements in the depth portion of a quantized fraction, there exists exactly N depth permutations of the quantized fraction, namely $D_0$, $D_1, D_2, \ldots, D_{N-1}$. An important observation to be made is that each permutation has exactly the same fractional value, i.e., the same numerator and denominator. All permutations depicted in FIG. 9(d), for example, have a numerator of 5 and a denominator of 16, so the fractional values for all permutations are $5/16$. Since the numerator and denominator of the fraction do not change, the difference between the permutations, therefore, is not how many numerator elements are shaded, but rather which numerator elements are shaded. $D_0$ has shaded elements {0, 1, 2, 3, 4}. In each successive permutation the interval and/or range of shaded elements is shifted one element to the right. For example, permutation $D_1$ has shaded elements {1, 2, 3, 4, 5}, permutation $D_2$ has shaded elements {2, 3, 4, 5, 6}, and likewise for the remaining permutations. All of these concepts are clearly depicted in FIG. 9(d).

Although FIG. 9 and its previous description is merely a graphical explanation of permutations of alpha and depth portions of a quantized fraction, the information has been presented this way purely for the sake of clarity. As has been explained before, such graphical depictions have direct and obvious counterparts in a digital computing environment. For example, any depth permutation depicted in FIG. 9(d) can be computed within a computer by providing three integers, namely a numerator, a denominator and a permutation number. Given these three pieces of information, a computer can reference or index into the array of elements comprising the quantized fraction and determine easily which elements are "shaded." Strictly speaking, the graphical depictions of permutations of alpha and depth portions of quantized fractions in this disclosure contain all the information that computationally matters to a real embodiment within any digital computing environment. So as not to obscure the system and method of the present invention, this disclosure focuses on the graphical depictions purely for the sake of clarity. Provided such information, it should be obvious that practical embodiments within a real computing environment exist. Digressing into such details would only serve to obscure the novelty of the present invention. So it is without limitation and/or loss of generality that the remainder of this disclosure focuses purely on the graphical depictions of permutations of alpha and depth portions of quantized fractions.

Figure 10:
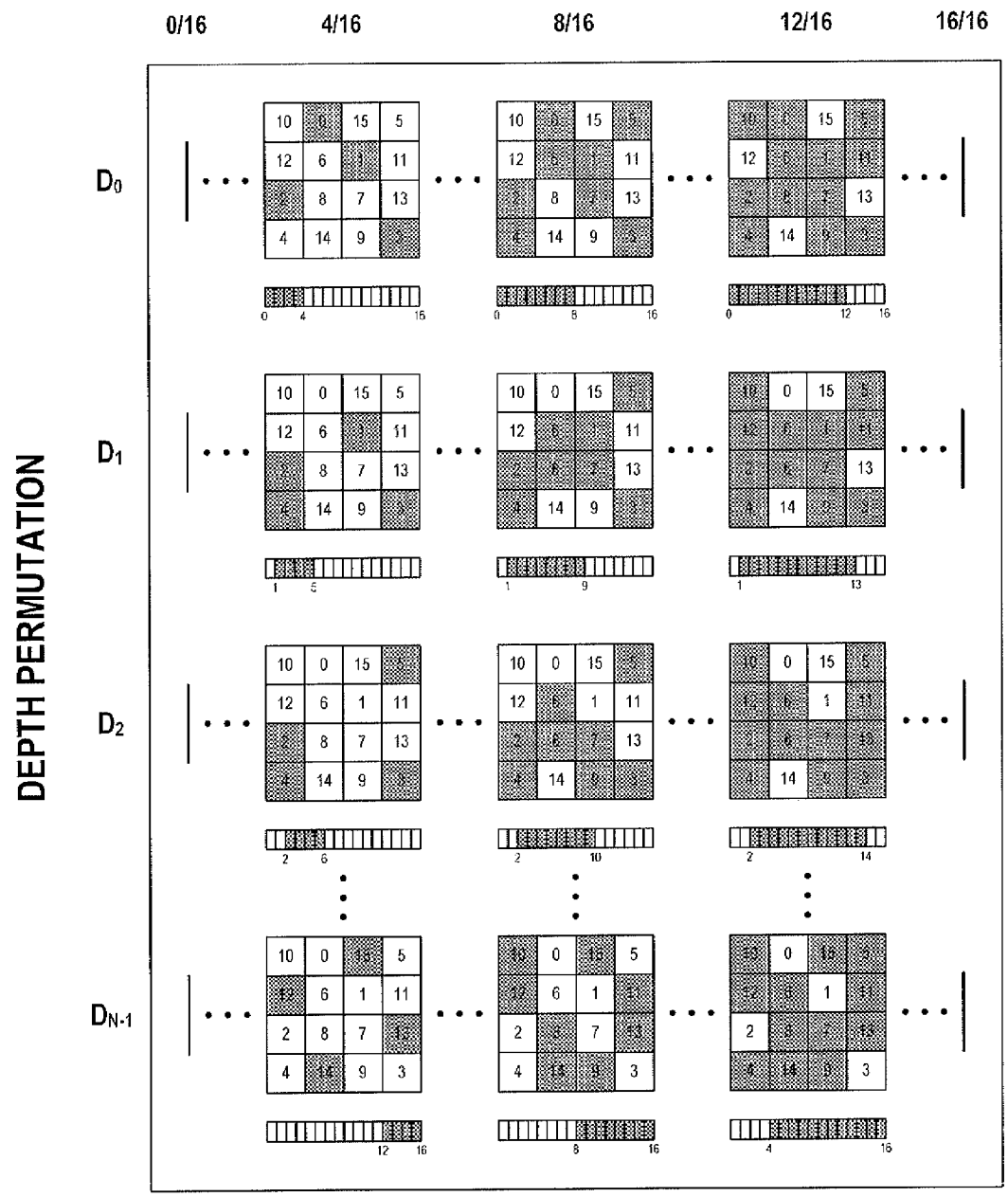
FIG. 10 depicts exemplary depth permutations for select opacity values, more particularly, stipple pattern depth permutations as a function of alpha and depth portions of a quantized fraction.

FIG. 10 shows the use of permutations of alpha and depth portions of a quantized fraction to create stipple patterns for the present invention. In contrast to the prior-art method of FIG. 4, notice that FIG. 10 is a two-dimensional table. For example, FIG. 4 and FIG. 10 both share the same number of columns, and the columns in both figures represent stipple patterns generated by and/or comprising a constant fractional opacity value. FIG. 4, however, has only one row of stipple patterns while FIG. 10 has many rows. More specifically, the prior art stipple patterns depicted in FIG. 4 are a function only of an opacity value, while the stipple patterns of the present invention depicted in FIG. 10 are a function of an opacity value and depth permutation. Therefore the table in FIG. 4 must have only one row whereas the table in FIG. 10 must have many. This is a dramatic and visual contradistinction between the prior art and the present invention. Notice also that the first depth permutation, e.g., row, for all columns in FIG. 10 is exactly equivalent to the entire prior-art table depicted in FIG. 4.

As can clearly be seen, each column in FIG. 10 represents a group of stipple patterns sharing the same opacity value. For each column there are multiple rows, each row representing a different stipple pattern due to a different depth permutation of the opacity value of the column. For example, as was previously explained, each depth permutation depicted in FIG. 9(d) has the same quantized fraction value of $5/16$, so too each column of stipple pattern in FIG. 10 has the same fractional opacity value. That is, the present invention partitions the opacity value, advantageously but not necessarily in the form of a fraction, into alpha and depth portions in order to compute depth permutations thereof, and the rows in each column are therefore a function of depth permutation of the respective opacity value fraction.

As should be obvious, the number of depth permutations in each column of FIG. 10 depends entirely on the quantized fraction of the column. For example, columns of opacity value fractions closer to zero will have more depth permutations than columns of opacity value fractions closer to one. This is due to the previously discussed fact that the number of depth permutations is equal to the difference between the denominator and numerator, and this difference becomes smaller as the ratio approaches one.

As should also be obvious, each stipple pattern in FIG. 10 is generated exactly as before, i.e., shaded values in the quantized fraction are applied to the correlation pattern to determine which code values are in the stipple pattern. In contradistinction to the prior art, which shaded values in the quantized fraction apply to the correlation pattern depends entirely on the depth permutation. This is clearly depicted in FIG. 10. For example, depth permutation $D_1$ of the quantized opacity in column $4/16$ specifies that code values 1, 2, 3, and 4 are in the stipple pattern, and this is unique from all depth permutations which remain in that column, e.g., depth permutation $D_2$ determines that code values 2, 3, 4, and 5 are in the stipple pattern, and this stipple pattern is therefore different from $D_1$.

As has already been explained before, the graphical depictions presented in these figures contain all the information that computationally matters for any embodiment within a real computer, and the subject matter is being presented this way for the sake of clarity. This point will not be re-discussed, except to note again that the graphical depictions are non-limiting examples, and their various embodiments within a real computing environment should be obvious.

Advantageously, and by combination of the parts and methods described so far, namely the use of permutations of alpha and depth portions of quantized fractions to generate stipple patterns, the present invention generates unique stipple patterns for every possible depth permutation of every possible fractional value of opacity. For example, it is a mathematical guarantee that each stipple pattern in FIG. 10 will be unique. This is true regardless of the resolution of the correlation pattern. For example, large correlation patterns can be used and the present invention will advantageously generate unique stipple patterns for all possible permutations of all possible fractional values of opacity.

Another advantageous feature of the present invention can be seen in the smooth and "incremental" manner in which changes between the stipple patterns associated with adjacent depth permutations occur. For example, examine the stipple patterns in column $12/16$ of FIG. 10. The stipple patterns associated with depth permutations $D_0$ and $D_1$ differ only by two code values, i.e., code value 0 is present in $D_0$ but missing in $D_1$, and code value 12 is present in $D_1$ but missing in $D_0$; all other shaded code values are present in both $D_0$ and $D_1$. Such is the case for all adjacent stipple patterns within each column of the table. This aspect of the present invention can be highly advantageous, as it causes the variation and/or distribution of code values in the stipple pattern to be "smooth" and regular in the transition between depth permutations. This produces an automatic transparency thresholding effect, an advantageous feature well-known in the prior art which usually requires the embodiment of separate prior-art methods, whereas in the context of the present invention it is implicit in the system and method and therefore comes "for free."

Taking all of these previously discussed advantageous features into consideration, the present invention therefore results in a better overall usage of stipple patterns in the rendering method, which will be discussed next. As will be shown, the final rendered image contains no visual artifacts typically associated with the prior art and, if large stipple patterns are used, the present invention produces exceptionally high-quality and realistic results.

Figure 11:
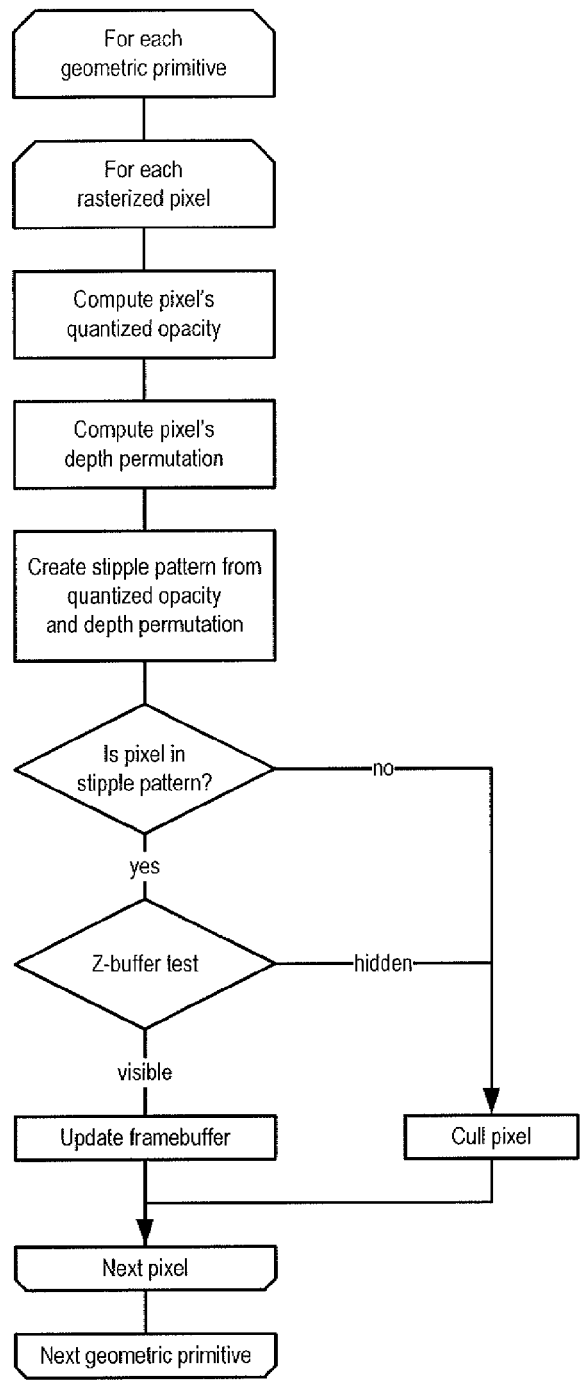
FIG. 11 is a flowchart representing an exemplary transparency method of the subject invention.

FIG. 11 shows how the stipple patterns depicted in FIG. 10 are used in a rendering method of the present invention. After opacity is computed or otherwise determined or associated for a pixel, an embodiment of the present invention must also compute a depth permutation for the opacity value, i.e., it must partition the opacity fraction into alpha and depth portions and then compute a depth permutation thereof. Having accomplished this, an embodiment of the present invention creates a stipple pattern as a function of the opacity value and depth permutation, whereas the prior art computes a stipple pattern only as a function of quantized opacity. Next, the stipple pattern is then used, as it is in the prior art, to cull rasterized pixels from the rendering method before the visibility step occurs.

Figure 12:
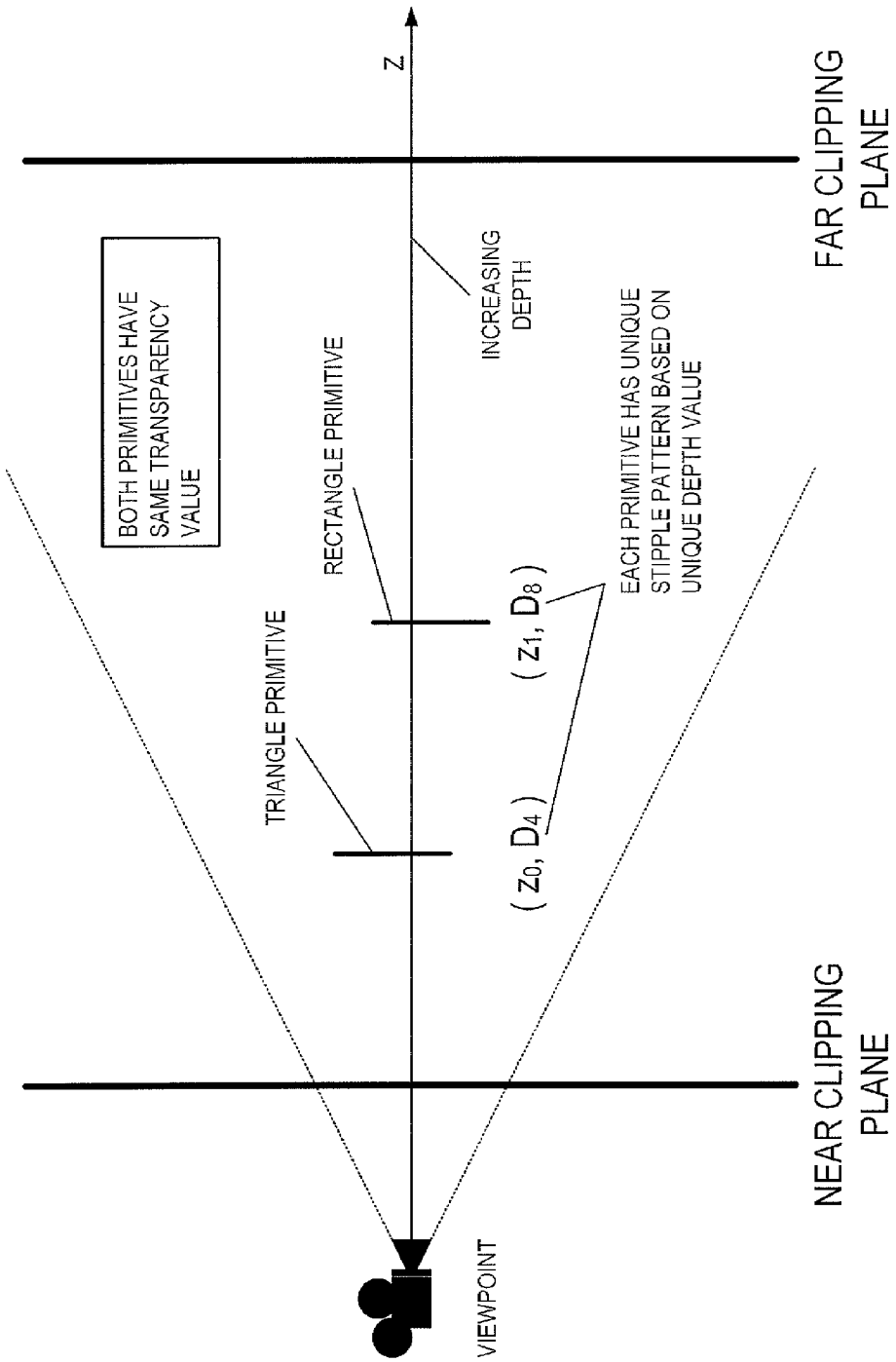
FIG. 12 depicts the representative, non-limiting arrangement of geometric primitives of FIG. 7 in connection to an exemplary transparency method of the subject invention.

FIG. 12 shows how the present invention selects a depth permutation. In the situation depicted in the figure, the triangle geometric primitive has depth $z_0$ and the rectangle primitive has depth $z_1$. Because all depths for any geometric primitive can be measured relative to the near and far clipping planes, it is therefore possible to normalize all depth values so they are in the range [0,1]. For example, normalized depth values 0 and 1 can map to the near and far clipping planes, respectively. Whatever form the normalization takes, all that is required is that depth values between the near and far clipping planes map to some location within the interval [0,1] while maintaining their original relative ordering. For example, $z_0<z_1$ must be true after normalization if it was true before normalization. Once a depth value is normalized, it is then trivial to select a depth permutation. If, as described previously, N is the number of elements in the depth portion of a quantized fraction, then selecting the depth permutation is simply equivalent to multiplying the normalized depth value by N and rounding or truncating to the nearest integer, i.e., the rounded or truncated result will be an integer k such that $0 \le k < N$, and k is then the depth permutation.

Depicted in FIG. 12 are the depth values $z_0$ and $z_1$ for the triangle and rectangle geometric primitives, respectively. In this case, both geometric primitives share the same opacity value, so N is also the same. Assume the shared opacity value of both geometric primitives is $4/16$. Computing k for $z_0$ and $z_1$ yields 4 and 8, respectively. Therefore the stipple pattern of the triangle primitive is $D_4$ and the stipple pattern for the rectangle primitive is $D_8$. Notice that, due to the present invention, both geometric primitives have unique stipple patterns even though they share the same opacity value.

Figure 13:
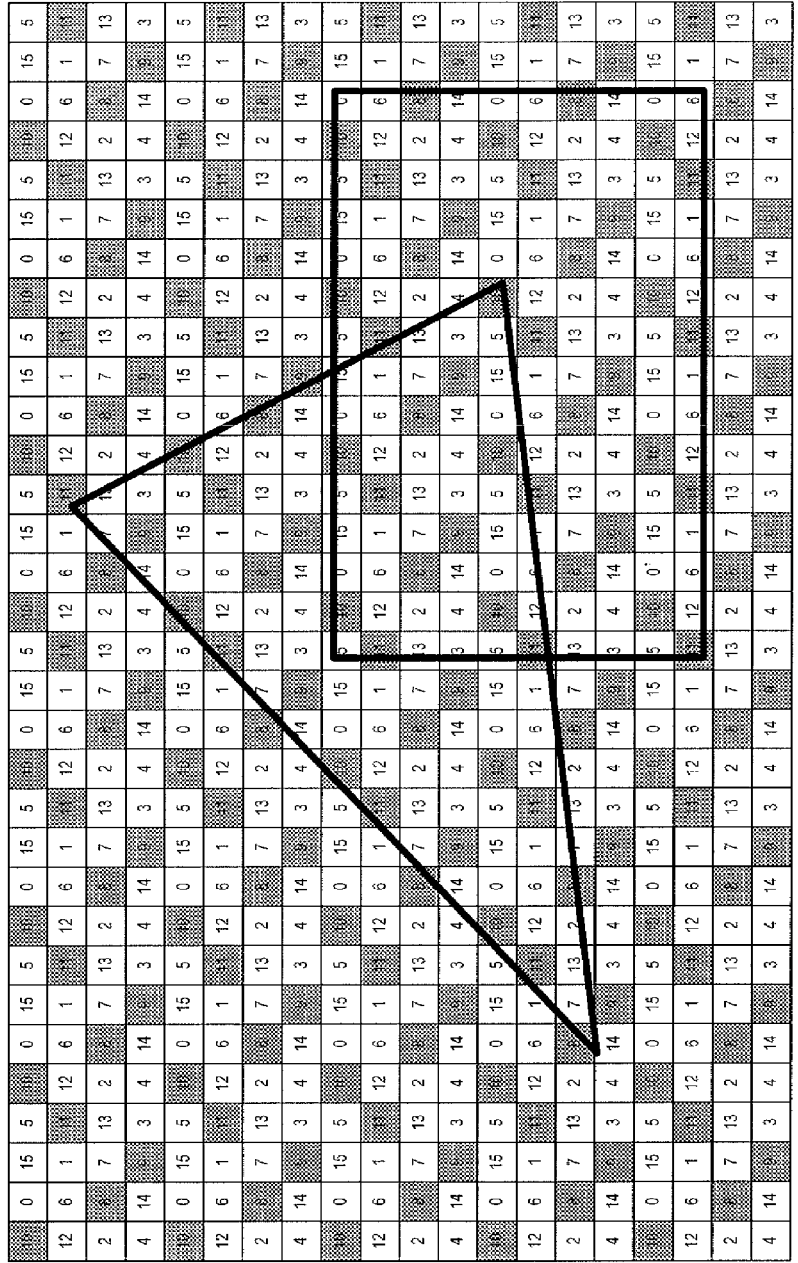
FIGS. 13(a)-13(c) are select representations of aspects of the exemplary transparency method of FIG. 11 or contemplated variants thereof in connection to the overlapping geometric primitives of FIG. 7; and, FIGS. 14(a)-14(c) depict variants of the depth permutations of FIG. 9(d), namely, alternate permutation sequences.

FIGS. 13(a)-(c) are select representations of aspects of the exemplary transparency method of FIG. 11. FIG. 13(a) shows the stipple pattern $D_4$ of the triangle primitive (code values 4, 5, 6, and 7 are in the stipple pattern). Similarly, FIG. 13(b) shows the stipple pattern $D_8$ of the rectangle primitive (code values 8, 9, 10, and 11 are in the stipple pattern). Because the two geometric primitives share the same opacity value, the number of shaded pixels in the stipple patterns depicted in FIGS. 13(a)-(b) are proportional, as it is in the prior art. However, the stipple patterns in FIGS. 13(a)-(b) are also unique because the shaded code values in the two stipple patterns are different, as the stipple patterns were created not only as a function of opacity but also as a function of depth permutation. FIG. 13(c) shows the logical conjunction, i.e., the logical "and," of the shaded pixels in FIG. 13(a) and FIG. 13(b). Pixels in FIGS. 13(a)-(b) which are no longer shaded in FIG. 13(c) have been culled by the stipple patterns of the two geometric primitives; pixels which remain shaded in FIG. 13(c) will be further processed by the visibility step of the method outlined in FIG. 11.

However, pay special attention to what will happen once the visibility step is executed. The visibility step, as previously discussed, will select or choose which geometric primitive will be rendered into each pixel. In the context of the present invention, both geometric primitives have unique stipple patterns despite the fact they also share the same opacity value. As a consequence, and unlike the prior art methods, all of the shaded pixels in FIG. 13(c) will pass the visibility step and be associated with their respective geometric primitive. For example, pixels with code values 4, 5, 6, and 7 will be associated with the triangle primitive; and pixels with code values 8, 9, 10, and 11 will be associated with the rectangle primitive. Pixels in the framebuffer will then be updated with the color associated with the code value of the respective geometric primitive selected by the visibility step.

As a consequence, and since both geometric primitives are $4/16$ opaque, 4 out of every 16 pixels in areas of the image belonging to the rasterized primitives which are not in the region of overlap will be updated with the colors of their respective geometric primitive. Most importantly, however, 8 out of 16 pixels in the region of overlap will be updated, and about half of these pixels will be updated with the color of the triangle and the other half will be updated with the color of the rectangle. In other words, the total and desired cumulative opacity of 4/16+4/16=8/16 between the two geometric primitives in the region of overlap has been achieved, i.e., information regarding the relative depth ordering of the two geometric primitives has been preserved. Going back to the previously discussed analogy of the transparent pieces of red and blue plastic, it is clear that the present invention in FIG. 13(*c*) produces the expected result, namely a dark purple "blend" of the two pieces of colored plastic.

In summary, what has been disclosed is a new and improved system and method for transparency in computer graphics. The method of the system involves creating unique stipple patterns for a pixel-culling step in a rendering method wherein the stipple patterns are a function of opacity and depth permutation. As a consequence, the present invention preserves information regarding the relative depth ordering of geometric primitives in a region of overlap, therefore causing the region of overlap between the transparent geometric primitives to render correctly in a reconstruction of an image.

Due to these advantageous facts regarding the present invention, high-quality images of interpenetrating and/or overlapping transparent objects can be synthesized, as the transparency effect of such conditions will "accumulate" properly, regardless of the order in which geometric primitives in the scene are processed. In this regard, the present invention is truly order-independent. Additionally, the present invention operates in a single pass, and the memory footprint required is a strictly constant and deterministic function of image size.

For very high-quality transparency effects, a rendering system may allocate many fragments per pixel so the stipple pattern has a subpixel resolution. Note that adding subpixel resolution is equivalent to increasing image resolution, so such systems and methods are easily amenable to the present invention and represent obvious advantageous embodiments of same. Generally speaking, as more subpixel resolution is available, higher-quality transparency effects may be achieved. For this reason, a rendering system can selectively choose the amount of subpixel resolution to suit the particular quality needs of a given implementation. If no subpixel resolution is used, the present invention still produces superior transparency effects to other prior-art "screen door" transparency methods, as the transparency calculations of the present invention accumulate properly in a region of overlap between two geometric primitives, even when the geometric primitives share the same opacity value.

For all these reasons, the present invention is perfectly suited for implementation in hardware, wherein memory resources are limited and must be bounded and/or constant. As has been shown in this disclosure, the system and method of the present invention lends itself well to embodiments based on existing computer graphics hardware designs, i.e., in many cases only small changes to existing hardware designs are necessary to gain all of the advantageous features of the present invention. Alternatively, the present invention also provides software rendering implementations a high-quality alternative to prior-art transparency methods that require (possibly) unbounded memory consumption or multiple render passes.

Figure 14:
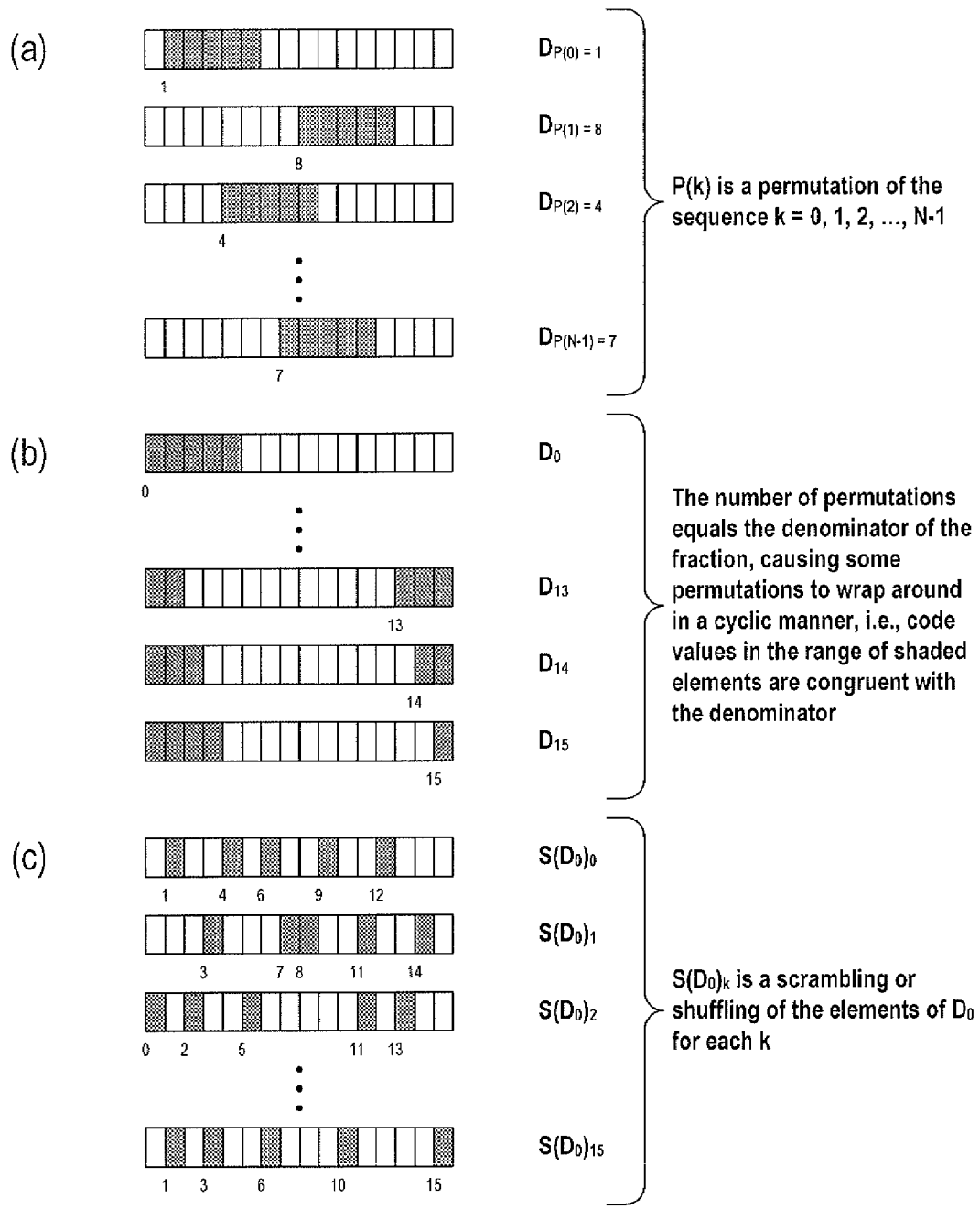

In as much as FIG. 9(*d*) illustrates an embodiment of the depth permutations of the present invention, alternate methods exist and are likewise contemplated. FIG. 14 illustrate representative, non-limiting permutation sequences. In FIG. 14(*a*), a double permutation method is used, that is, the sequence k=0, 1, 2, ..., N−1 is replaced with P(k), a permutation of the original sequence. Instead of the numerator elements of each depth permutation $D_k$ being shifted to the right by k elements, as depicted in FIG. 9(*d*), the numerator elements of each depth permutation $D_k$ are instead shifted by P(k) elements, as depicted in FIG. 14(*a*). If P(k) is a true permutation of the original sequence, each shift amount specified by P(k) will occur exactly once, i.e., all shifts in the original sequence occur, except they occur in a different order. Such a permutation P(k) can be easily implemented in a computer using a linear congruential generator of the form P(k)=(a·k+c) mod N, wherein a and c are prime numbers larger than N or, if a and c are integers smaller than N, they satisfy certain arithmetical properties relative to N. See, for example, chapter 3.2.1 of the book "The Art of Computer Programming, Vol. 2: Seminumerical Algorithms, Third Edition," Knuth, Donald E., Addison Wesley, 1998, said chapter of said book being incorporated herein by reference.

FIG. 14(*b*) shows another alternative embodiment of the depth permutations. In this case, the number of depth permutations is not equal to the difference between the denominator and numerator of a quantized fraction, as previously depicted in FIGS. 9(*b*)-(*d*). Instead, the number of depth permutations is simply equal to the denominator of the quantized fraction. Consequently, as numerator elements in FIG. 14(*b*) are shifted to the right for each permutation, eventually they begin to "wrap around" to the beginning in a cyclical manner, i.e., they are congruent with the denominator and/or the resolution of the quantized fraction. When k=13, for example, FIG. 14(*b*) shows how two shaded numerator elements of the permutation are congruent, i.e., shaded elements for the permutation are {13, 14, 15, 0, 1}, wherein elements 0 and 1 have "wrapped around" to the beginning, i.e., they are congruent with the denominator and/or the resolution of the quantized fraction. Similar behavior is also depicted in the figure for k=14 and k=15, wherein the shaded elements are {14, 15, 0, 1, 2} and {15, 0, 1, 2, 3}, respectively. Such an embodiment of the depth permutations in the context of the present invention can be highly advantageous.

Last but not least, FIG. 14(*c*) shows a scrambling or shuffling method, wherein the elements of depth permutation $D_0$ are scrambled or shuffled for each depth permutation instead of being shifted as in FIG. 9(*d*) or FIGS. 14(*a*)-(*b*). Note that in the case of FIG. 14(*c*), the scrambling or shuffling of elements within the quantized fraction provides, for all that computationally matters, the same function and/or purpose of the correlation pattern in previously discussed methods which are based on shifting an interval and/or range of numerator elements, for example, FIG. 9(*d*) and FIGS. 14(*a*)-(*b*). For this reason, FIG. 14(*c*) is computationally equivalent to any of the previously described embodiments of the present invention, and it is therefore an example of how different implementations and/or embodiments can be used to achieve the same computational results.

As should also be obvious, any combinations of previously discussed depth permutation methods are contemplated and amenable to embodiments within the present invention. For example, the double-permutation method depicted in FIG. 14(*a*) can be advantageously combined with the cyclical, i.e., congruential method depicted in FIG. 14(*b*). Systems of the present invention may advantageously select or choose to embody different depth permutation methods and/or different combinations of depth permutation methods to suit the needs of a particular computing environment and/or user scenario.

The system and method of the present invention also extends easily and naturally to high-quality spectral transparency effects. Typically, a single z-buffer is allocated and used to perform the previously discussed visibility step in FIG. 11. However, if a separate z-buffer is allocated for each of the red, green and blue spectral components of the image, and if during the rendering method depicted in FIG. 11 the spectral z-buffers are all tested, the result is a high-quality spectral transparency effect in the final reconstruction of the image. In other words, geometric primitives can reproduce the real-world filtering behavior of transparent materials such as stained glass or colored cellophane. In this case, the present invention not only accumulates the transparency of transparent geometric primitives properly; it also properly filters the color of distant objects in the scene by the spectral composition of the transparent geometric primitives in the foreground. For example a green transparent geometric primitive can act as a filter, essentially blocking any red or blue in the scene behind the geometric primitive and allowing only green to "pass through" and/or contribute to the final transparency effect. This is a highly advantageous feature of the present invention.

Similarly, the present invention provides a novel method for computing transparent and/or colored shadows. To achieve such an effect, the scene is rendered from the light's perspective using a system and method of the present invention. In this case, the resulting depth map associates a single depth value with each pixel in the map, implicitly preserving accumulated stipple patterns of the transparent objects, e.g., FIG. 13(c). The scene is then rendered from the camera's perspective, and shadow tests are calculated by performing lookups into the previously computed depth map. Prior art filtering methods, such as percentage-closer filtering, e.g., "Rendering Antialiased Shadows with Depth Maps," Reeves, William, et. al., Computer Graphics, 1987, or variance shadow mapping, e.g., "Variance Shadow Maps," Donnelly, William and Andrew Lauritzen, Symposium On Interactive 3D Graphics and Games, 2006, can be performed during the lookups to provide filtered results. By performing these steps, the transparency information previously computed and preserved by the present invention within the depth image is implicitly extracted (and possibly filtered) from the depth map, resulting in transparent shadows.

For colored shadows, the system renders the scene from the light's perspective using spectral z-buffers, as previously described, and stores a red, green and blue depth value in the depth map for every light pixel, e.g., FIG. 13(c), again, but in this case for each red, green and blue spectral component of the image. Then the scene is rendered from the camera's perspective and the spectral transparency information previously computed by the present invention is implicitly extracted and/or filtered from the depth map, as previously described but in this case for each spectral component, resulting in colored shadows. This allows for the rendering of computer graphics scenes comprising, for example, a stained-glass window casting a colored shadow onto other objects in the scene in a manner that is highly realistic and even physically accurate.

In the case of both transparent and colored shadows, the advantage of using the present invention is only a single depth value (or a single red, green and blue depth value, if colored shadows are used) must be stored in the depth map. This is in contrast to other methods for transparent and/or colored shadows, such as Pixar's "deep shadow" maps, i.e., U.S. Pat. No. 6,760,024 B1 (Lokovic et al.), which must store a piecewise-linear function comprised of a variable-sized list of information for each pixel. Therefore, shadow maps computed with a system and method of the present invention are much smaller in size and more efficient to access at render time.

There are other variations of this invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

What is claimed is:

1. A single-pass, order-independent method in support of rendering transparency effects into a computer generated image, said method comprising:
   a. rasterizinq a geometric primitive of a scene so as to convert said geometric primitive into a set of pixels; and,
   b. selecting, for a pixel of said set of pixels, a stipple pattern from a set of unique stipple patterns, said set of unique stipple patterns characterized by a select opacity value, said stipple pattern delimiting a unique set of pixels in the computer generated image which contribute to a visible surface determination, wherein each stipple pattern of said set of unique stipple patterns is a stipple pattern permutation comprising a representation of a unique set of code values of a quantity of codes values of a select correlation pattern.

2. The method of claim 1 wherein said selecting is premised upon a depth value of said geometric primitive.

3. The method of claim 1 wherein said stipple pattern correlates to a select depth value of said geometric primitive.

4. The method of claim 1 wherein said opacity value is characterized by a fraction representing a proportion of said unique set of code values.

5. The method of claim 4 wherein said selecting is premised upon a depth permutation of depth permutations of a depth portion of said fraction which corresponds to a depth value of said geometric primitive.

6. The method of claim 1 wherein said stipple pattern permutation is delimited by a range of consecutive code values of said quantity of code values.

7. The method of claim 6 wherein each code value in said range of consecutive code values is congruent with said quantity of code values.

8. The method of claim 1 wherein said stipple pattern permutation comprises a subset of code values of said quantity of code values.

9. The method of claim 6 wherein each said stipple pattern permutation is delimited by an incremental shifting of said range of consecutive code values by a preselect quantity of code values.

10. The method of claim 6 wherein each said stipple pattern permutation is delimited by an incremental shifting of said range of consecutive code values by a single code value.

11. The method of claim 6 wherein each said stipple pattern permutation is delimited by an incremental shifting of said range of consecutive code values to a unique position within a range of said quantity of code values.

12. The method of claim 6 wherein said set of unique stipple patterns is characterized by an incremental shifting of said range of consecutive code values by a preselect quantity of code values for each and every stipple pattern permutation.

13. The method of claim 6 wherein said set of unique stipple patterns is characterized by an incremental shifting of said range of consecutive code values by a single code value for each and every stipple pattern permutation.

14. The method of claim 6 wherein said set of unique stipple patterns is characterized by a selective shifting of said range of consecutive code values to unique positions within a range of said quantity of code values.

15. The method of claim 1 further comprising a step of culling said pixel or subpixel from the computer generated image based upon the stipple pattern selected from said set of unique stipple patterns.

16. The method of claim 1 wherein said opacity value comprises a ratio.

17. The method of claim 1 wherein said opacity value is characterized by a fraction.

18. The method of claim 1 further comprising rendering a spectral transparency effect for said set of pixels.

19. The method of claim 1 in combination with a method of rendering a shadow effect in a computer generated image.

20. The method of claim 1 in combination with a method of rendering a color shadow effect in a computer generated image.

21. The method of claim 1 implemented within a hardware circuit.

22. The method of claim 1 executed by machine readable code of a computer program.

23. A system for executing the method of claim 1.

24. A single-pass, order-independent method in support of rendering transparency effects into a computer generated image, said method comprising: a. rasterizing a geometric primitive of a scene so as to convert said geometric primitive into a set of pixels; and, b. for a select opacity value for at least a pixel or a subpixel of said set of pixels, selecting a stipple pattern from a set of unique stipple patterns, each stipple pattern of said set of unique stipple patterns delimited by a select depth permutation of a set of unique depth permutations of said select opacity value, each stipple pattern of said set of unique stipple patterns being a stipple pattern permutation comprising a representation of a unique set of code values of a quantity of codes values of a select correlation pattern, said selected stipple pattern delimiting a unique set of pixels in the computer generated image which contribute to a visible surface determination.

25. A single-pass, order-independent method in support of rendering transparency effects into a computer generated image, said method comprising the steps of: associating an opacity value with a pixel or subpixel of a rasterized geometric primitive of a scene; selecting a depth permutation from depth permutations of said opacity value based upon a depth value associated with the geometric primitive of the scene; delimiting a stipple pattern as a function of said opacity value and said selected depth permutation, wherein said stipple pattern is a stipple pattern permutation comprising a representation of a unique set of code values of a quantity of codes values of a select correlation pattern; and, selectively culling said pixel or subpixel from the computer generated image based upon the delimited stipple pattern.

26. A method of rendering transparent effects into a computer generated image, the method comprising: a. rasterizing a geometric primitive of a scene so as to convert said geometric primitive into a set of pixels; b. establishing a set of unique stipple patterns, for a select opacity value, for a pixel of said set of pixels, wherein each stipple pattern of said set of unique stipple patterns is a stipple pattern permutation comprising a representation of a unique set of code values of a quantity of codes values of a select correlation pattern; and, c. selecting a stipple pattern from said set of unique stipple patterns for association with said pixel of said set of pixels, said selecting premised upon a depth value of said geometric primitive, said each stipple pattern having an association with each permutation of said depth value of said geometric primitive such that geometric primitives having common 2-D scene space are accurately represented with regard to transparency in a visible surface determination assessment.

* * * * *